United States Patent
Edwards

(10) Patent No.: US 11,383,181 B2
(45) Date of Patent: Jul. 12, 2022

(54) SYSTEMS AND METHOD FOR A COOLANT CHAMBER

(71) Applicant: NBCUniversal Media, LLC, New York, NY (US)

(72) Inventor: Charles Edwards, Mesa, AZ (US)

(73) Assignee: NBCUniversal Media, LLC, New York, NY (US)

( * ) Notice: Subject to any disclaimer, the term of this patent is extended or adjusted under 35 U.S.C. 154(b) by 0 days.

(21) Appl. No.: 16/952,679

(22) Filed: Nov. 19, 2020

(65) Prior Publication Data

US 2021/0229001 A1 Jul. 29, 2021

Related U.S. Application Data

(60) Provisional application No. 62/965,693, filed on Jan. 24, 2020.

(51) Int. Cl.
| | |
|---|---|
| *F21V 29/58* | (2015.01) |
| *B01D 19/00* | (2006.01) |
| *F21V 7/06* | (2006.01) |
| *F21Y 115/10* | (2016.01) |

(52) U.S. Cl.
CPC ..... *B01D 19/0063* (2013.01); *B01D 19/0052* (2013.01); *F21V 29/59* (2015.01); *F21V 7/06* (2013.01); *F21Y 2115/10* (2016.08)

(58) Field of Classification Search
None
See application file for complete search history.

(56) References Cited

U.S. PATENT DOCUMENTS

| | | | | |
|---|---|---|---|---|
| 2019/0320514 A1* | 10/2019 | Edwards | ................... | F21V 7/06 |
| 2020/0003477 A1* | 1/2020 | Mitchell | ................. | F25D 23/00 |

* cited by examiner

*Primary Examiner* — Elmito Breval
(74) *Attorney, Agent, or Firm* — Fletcher Yoder, P.C.

(57) ABSTRACT

A debubbler system includes a hollow enclosure that includes an inlet and an outlet directing the flow of coolant fluid into and out from the hollow enclosure, respectively. The debubbler system further includes a check valve to exhaust gaseous bubbles in the coolant fluid out of the hollow enclosure to reduce the gaseous bubbles in the coolant fluid. The debubbler system also includes a vent tube fluidly coupled to the check valve, such that the vent tube is positioned opposite a weighted member that is fixed relative to a central axel that rotates about a rotation axis. The debubbler system may be part of a cooling system for cooling electronics systems, such as light-emitting diode (LED) lighting systems.

20 Claims, 29 Drawing Sheets

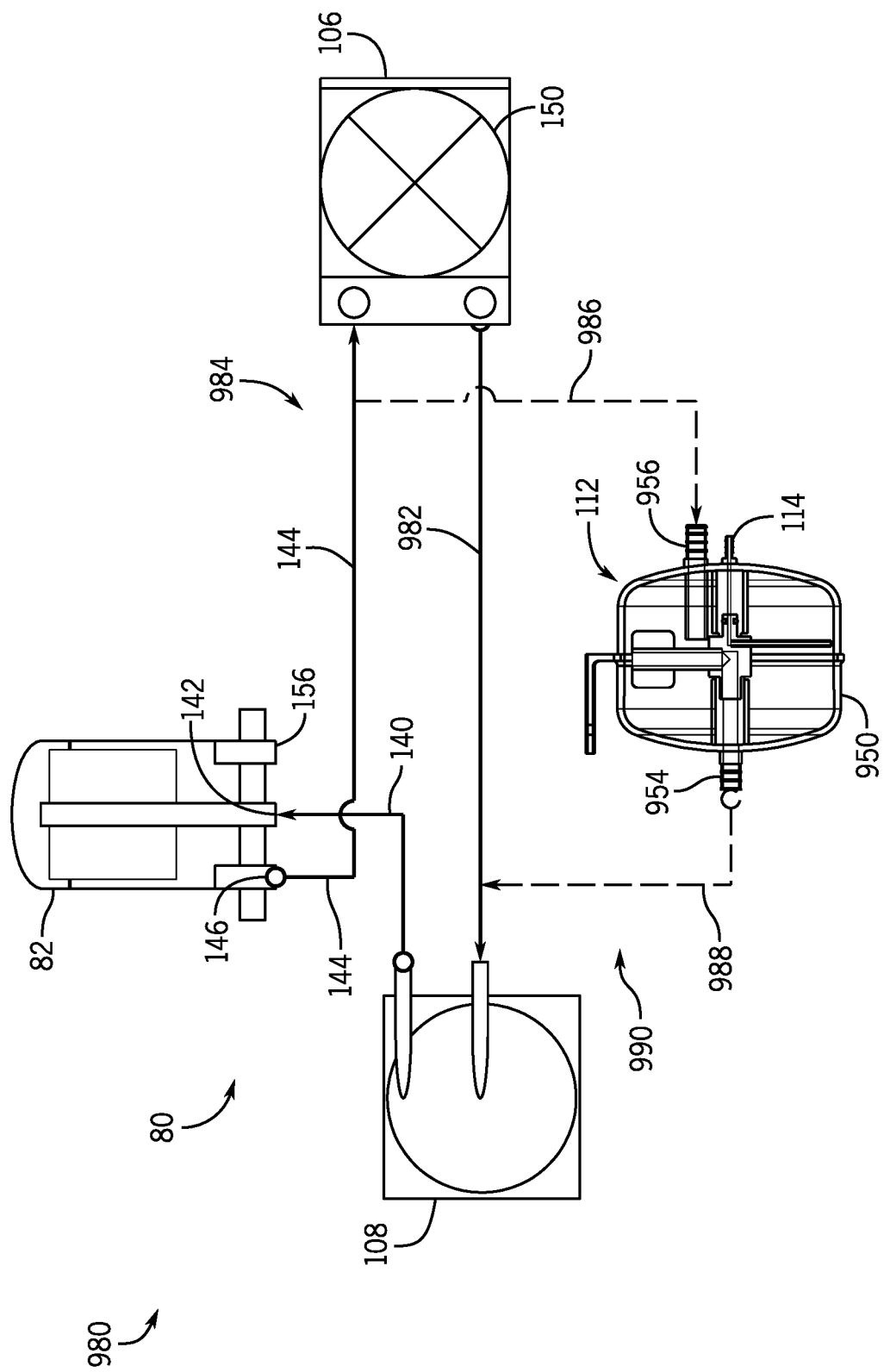

SYSTEMS AND METHOD FOR A COOLANT CHAMBER

CROSS REFERENCE TO RELATED APPLICATIONS

This application claims priority to and the benefit of U.S. Provisional Patent Application No. 62/965,693, entitled "Debubbler Systems and Methods for Cooling Devices," filed Jan. 24, 2020, which is hereby incorporated by reference in its entirety for all purposes.

BACKGROUND

The present disclosure relates generally to a coolant chamber for a cooling apparatus. In particular, the present disclosure relates to systems and methods for reducing gas bubbles, managing fluid thermal expansion, and venting and pressure compensation in cooling systems for light emitting diode (LED) lighting instruments or other lighting instruments.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, LED lighting instruments may provide lighting for a variety of applications. In some applications, high intensity lighting from LED lighting instruments may be enhance lighting and visibility in certain areas. For example, LED lighting instruments may provide high intensity lighting for motion picture and television sets and studios. To provide such high intensity lighting (e.g., lighting consuming 500 W-1500 W of total power), an arrangement of LEDs within the lighting instruments may be relatively dense and numerous. As the density of LEDs in a given space increase, an amount of heat produced by the LEDs and a temperature of the LEDs may generally increase. Typical Wall Plug Efficiency ("WPE") of blue LEDs used to make white light may be about 50% such that about 50% of the energy will be converted into photons and the other 50% will be lost as heat. There may be an additional loss when the light is converted from blue light to white by the phosphors. In these cases, about half of the electrical power provided to LEDs is converted into heat. As such, it should be appreciated that efficient cooling systems for LED systems may enhance performance, longevity, and efficiency of the LED systems.

Conventional cooling techniques for lighting systems may not sufficiently cool such high intensity LED lighting instruments. Additionally, Chip Scale Packaging ("CSP") technology and Chip on Board ("COB") arrays provide the ability to directly attach LED die to a printed circuit board ("PCB") without a package. Typical LED die may be about 1 millimeter (mm) in size (e.g., a length of the die) or less. The LED die are packaged separately, which makes them easier to handle in manufacturing and increases the available area for dissipating heat (e.g., 3 mm×3 mm is a common package for example). In COB and/or CSP technology, an array of LED dies may be attached directly to a high-resolution PCB which may increase the power density. LED arrays with power densities of 80 watts per square inch and higher are produced today with these CSP and COB technologies with higher power densities constantly being developed. LEDs may typically be maintained at a junction temperature of less than 125 degrees Celsius or they will be damaged. Due to the heat restrictions, the packing density of LEDs in system designs may be effectively limited by heat. However, traditional air-cooling techniques, such as heat sinks, may not sufficiently cool the LED lighting instruments. Even adding fans to increase airflow over metal heat sinks provides limited heat dissipation.

Furthermore, cooling techniques employing cooling fluid may operate in suboptimal manners. For example, as cooling fluid facilitates heat dissipation of the LED lighting instrument, the cooling fluid may be subject to different temperatures, which may decrease and/or increase the pressure of the cooling fluid in constant volumes. The fluctuation in pressure may create bubbles in coolant fluid flow paths, thereby affecting the efficiency of the cooling technique. Accordingly, there is a need to improve the lighting instrument cooling by reducing bubbles in the coolant fluid flow paths, the implementation of which may be difficult to develop and coordinate in various systems generating high temperatures.

BRIEF DESCRIPTION

Although the following description describes cooling systems used in an LED assembly, the cooling systems may be deployed in other systems, such as electronic systems. Debubbler systems and methods disclosed herein may reduce bubbles in coolant flow paths associated with light cooling systems of the LED assembly. The light cooling systems include a coolant fluid configured to flow over the LED assembly along a coolant flow path to cool LEDs emitting light and to remove heat produced by the LEDs. A pump of the cooling system may circulate the coolant fluid along the coolant flow path between the LED assembly, a heat exchanger that removes the heat from the coolant fluid, and a debubbler system. A debubbler system may include a hollow enclosure that includes an inlet and an outlet to receive the coolant fluid via the coolant fluid flow path. The debubbler system further includes a check valve to exhaust air bubbles in the coolant fluid out of the hollow enclosure to reduce air bubbles in the coolant fluid. The check valve may be fluidly coupled to a vent tube, such that an opening of the vent tube is above the coolant fluid. The debubbler system may be part of a cooling system for cooling electronics systems, such as LED lighting systems.

DRAWINGS

These and other features, aspects, and advantages of the present disclosure will become better understood when the following detailed description is read with reference to the accompanying drawings in which like characters represent like parts throughout the drawings.

Figure 1:
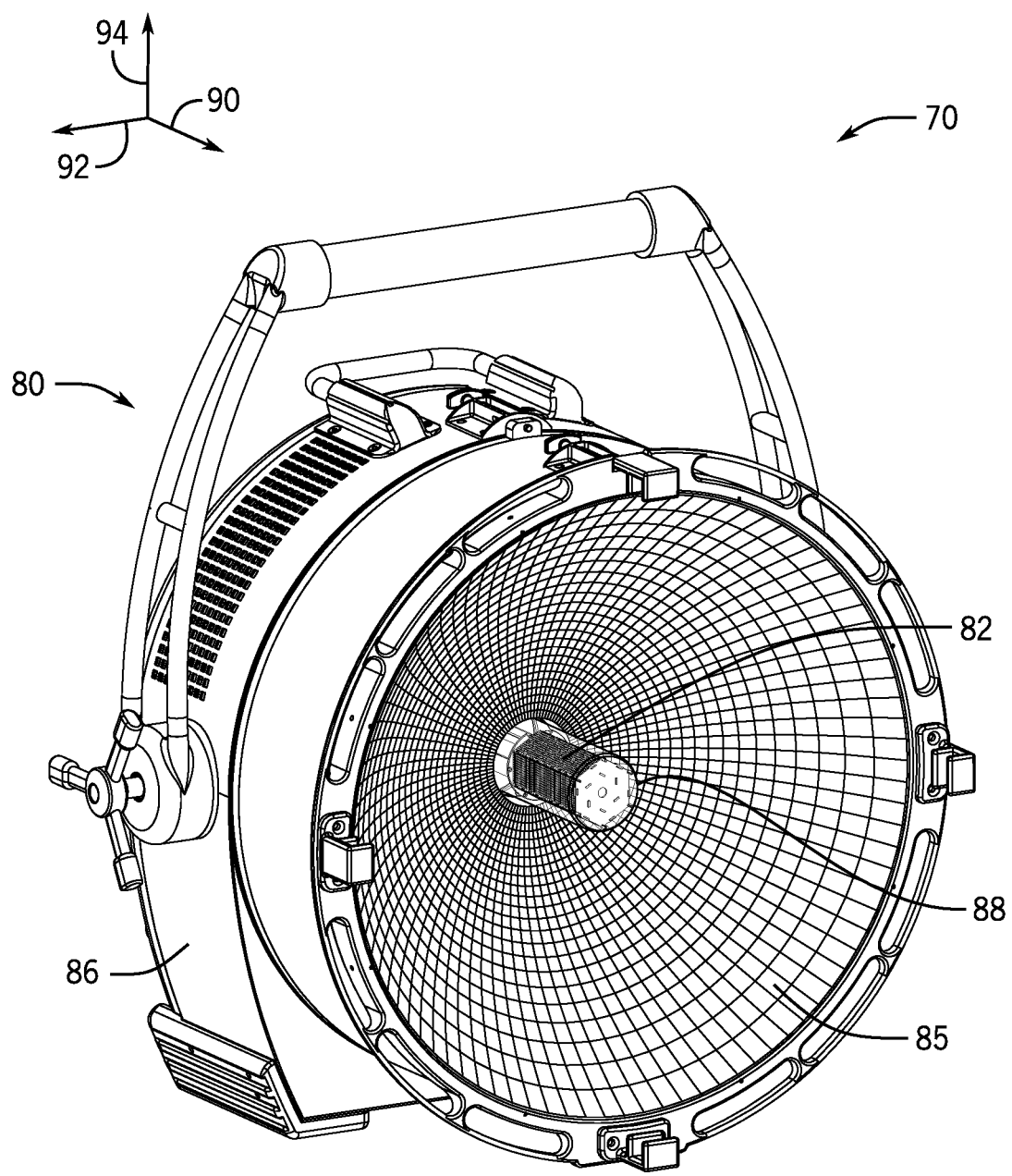
FIG. 1 is a perspective view of an embodiment of a lighting assembly having a light emitting diode (LED) assembly and a cooling system, in accordance with one or more current embodiments.
Figure 7:
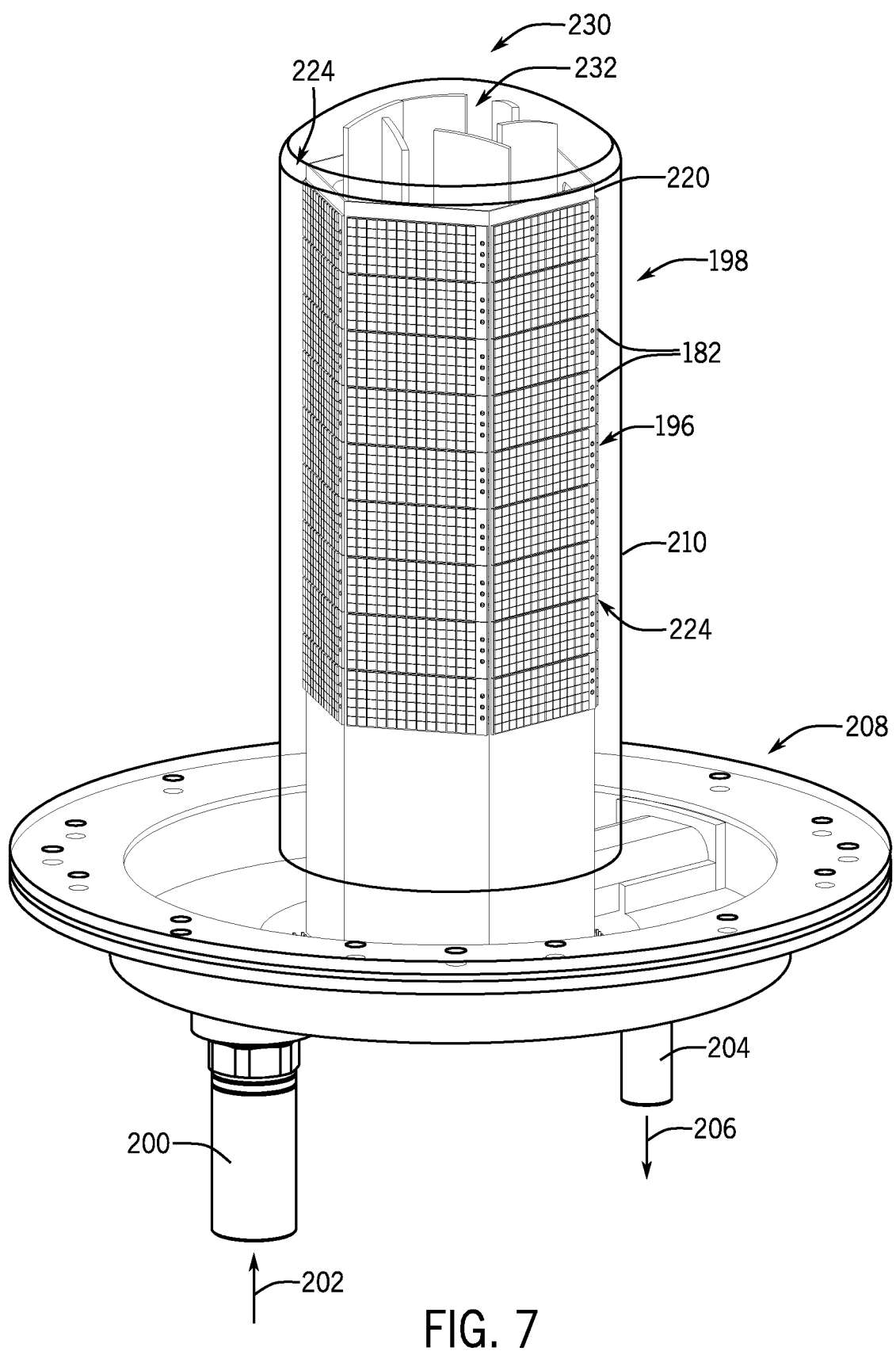
FIG. 7 is a perspective view of another embodiment of the cooling system and the LED assembly of FIG. 1 including a transparent enclosure, in accordance with one or more current embodiments.
Figure 12:
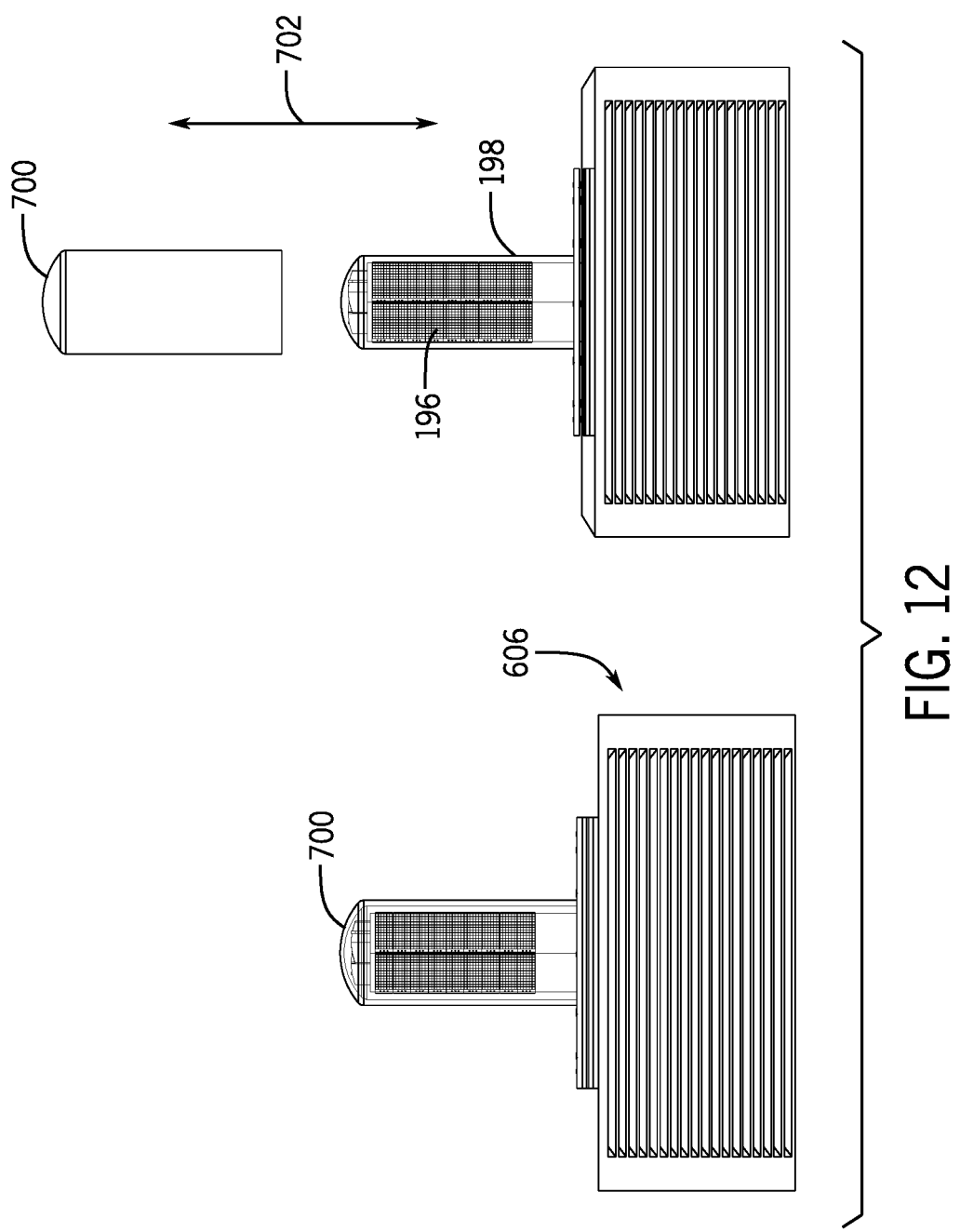
Figure 13:
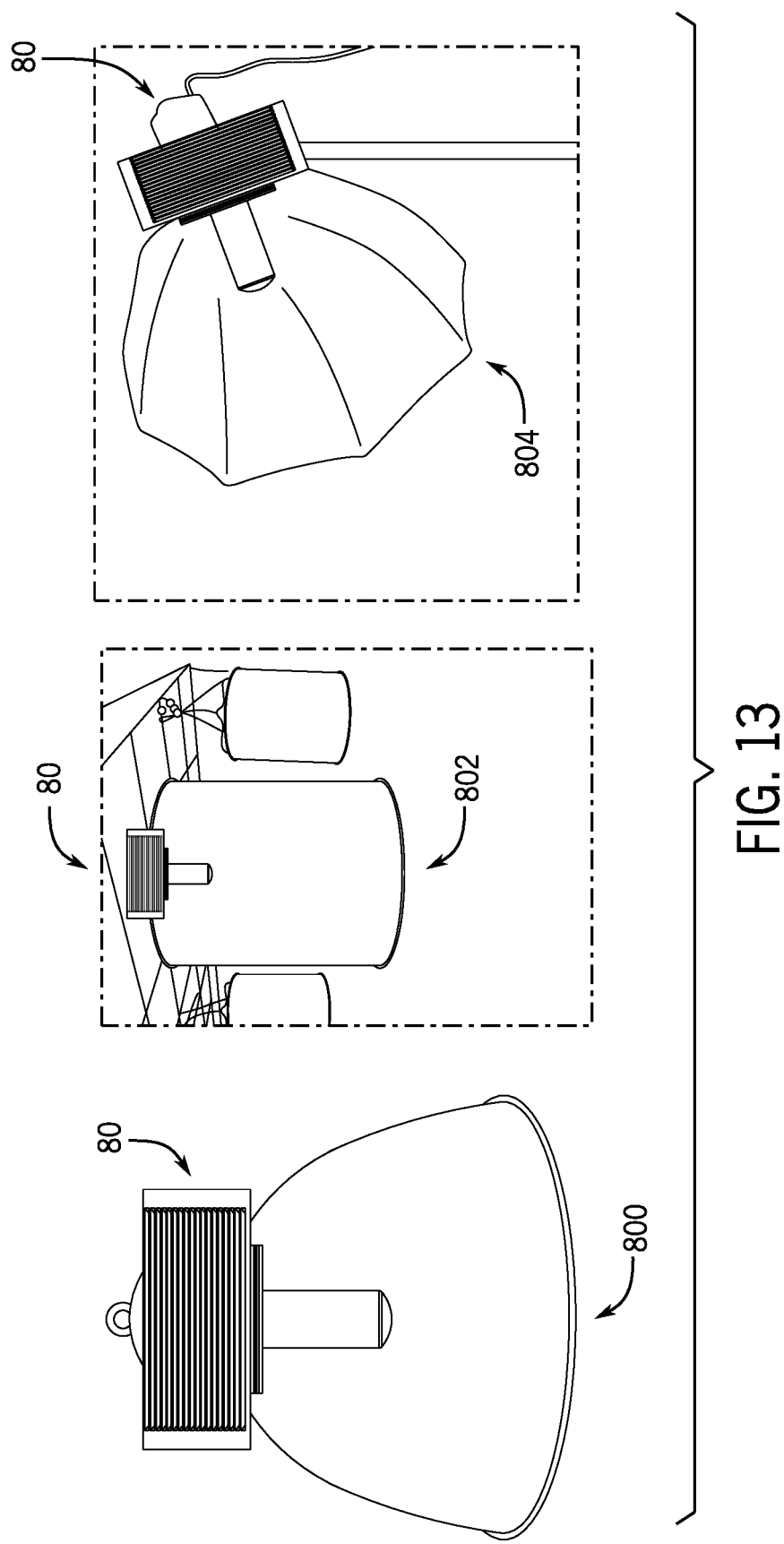
Figure 14:
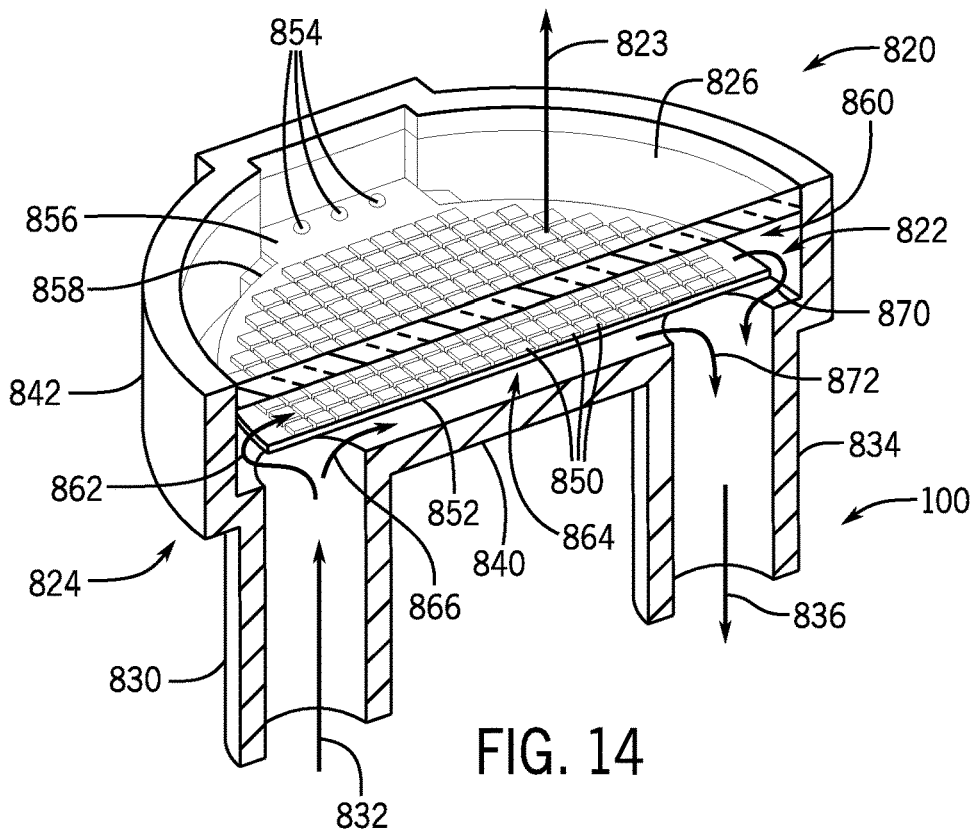
Figure 15:
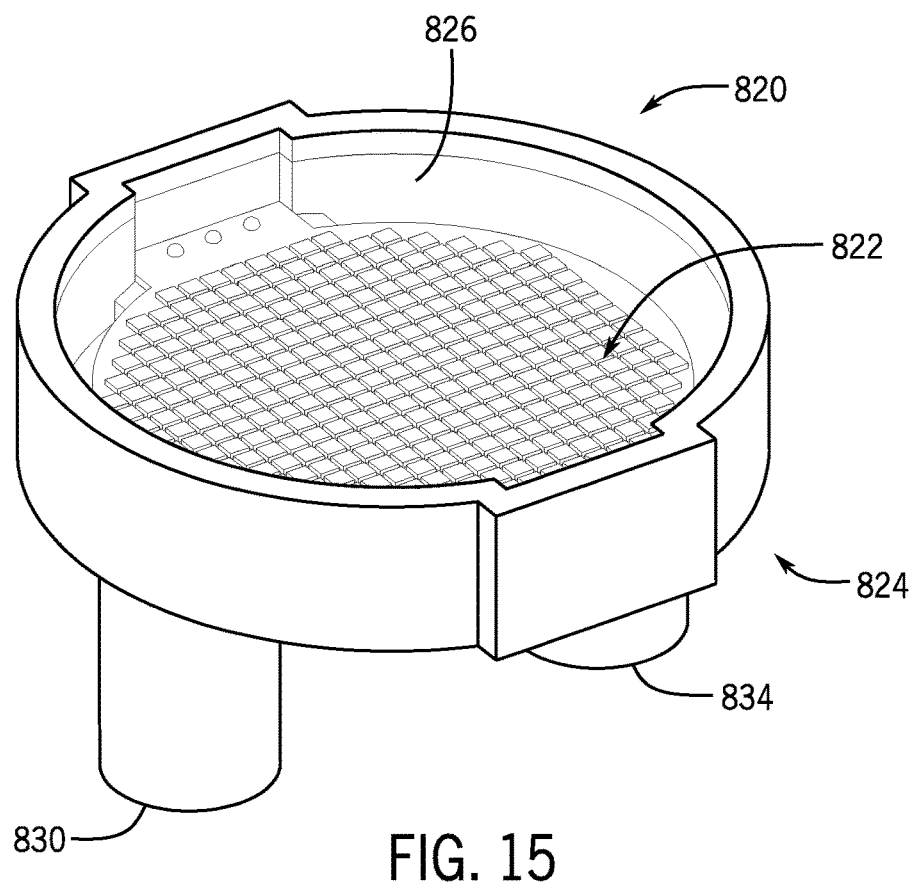
Figure 16:
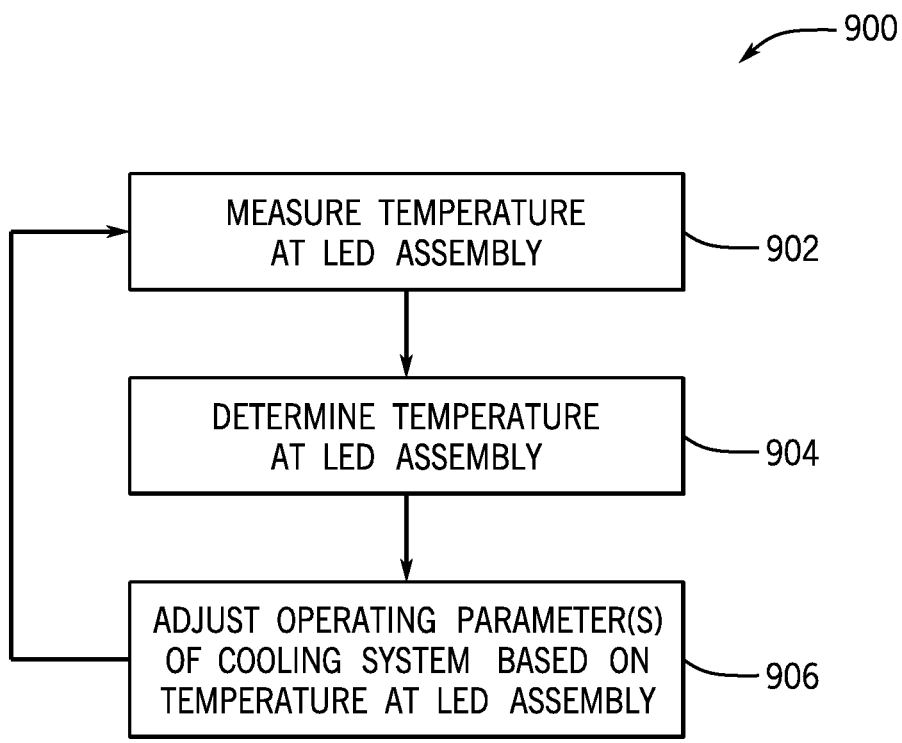
Figure 17:
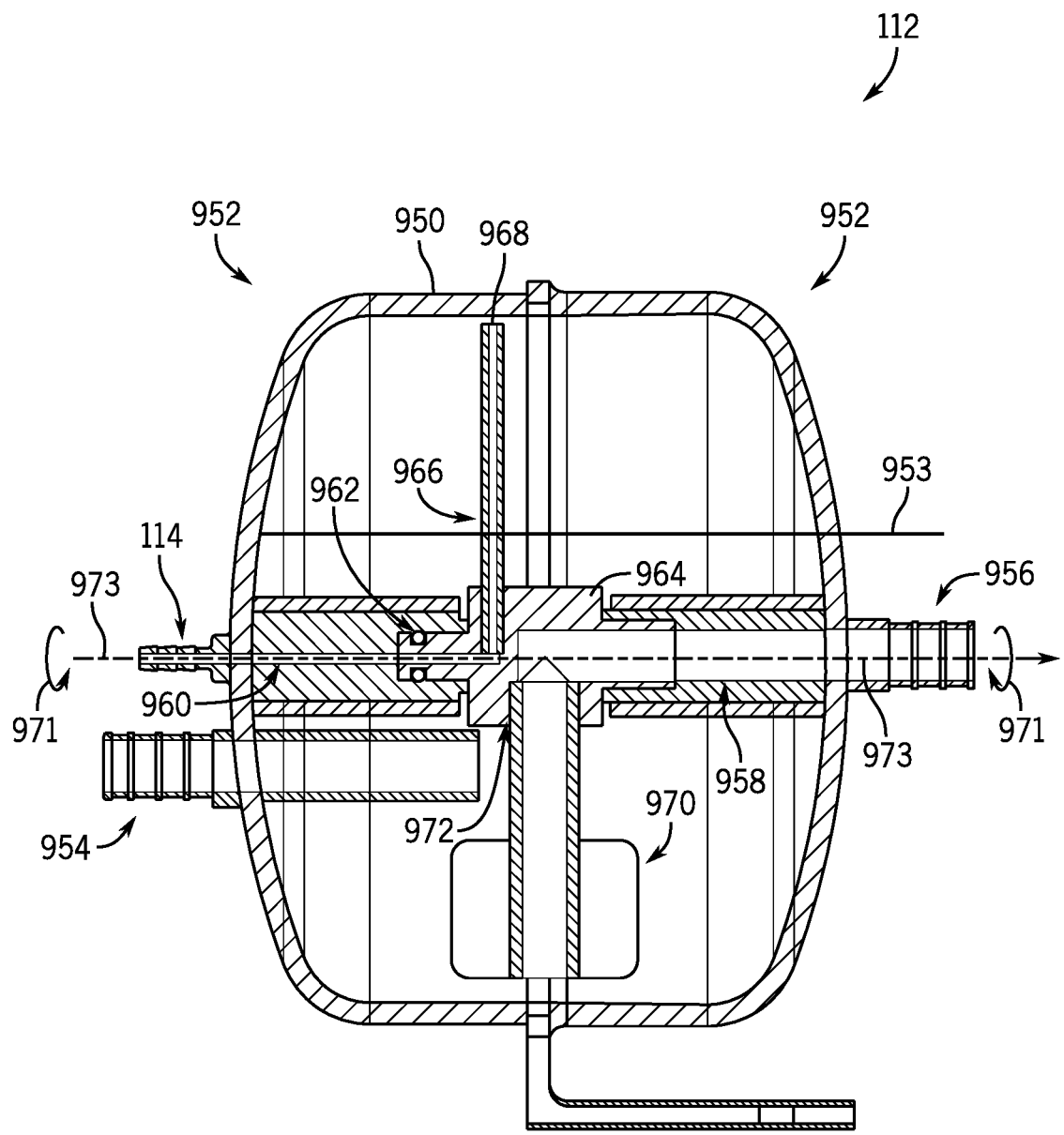
Figure 18B:
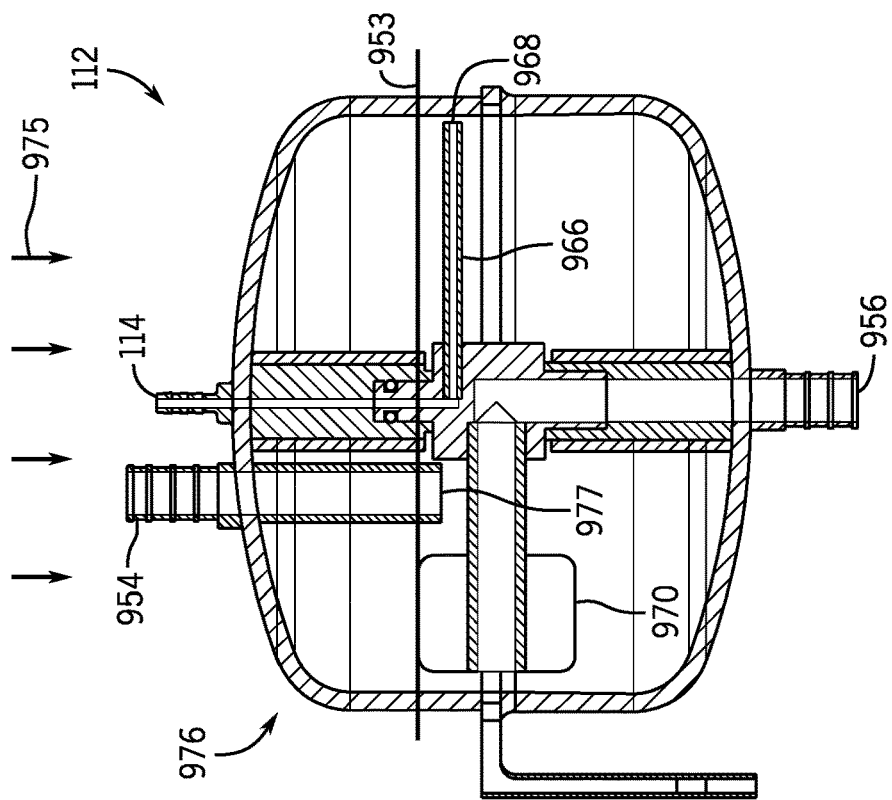
Figure 18A:
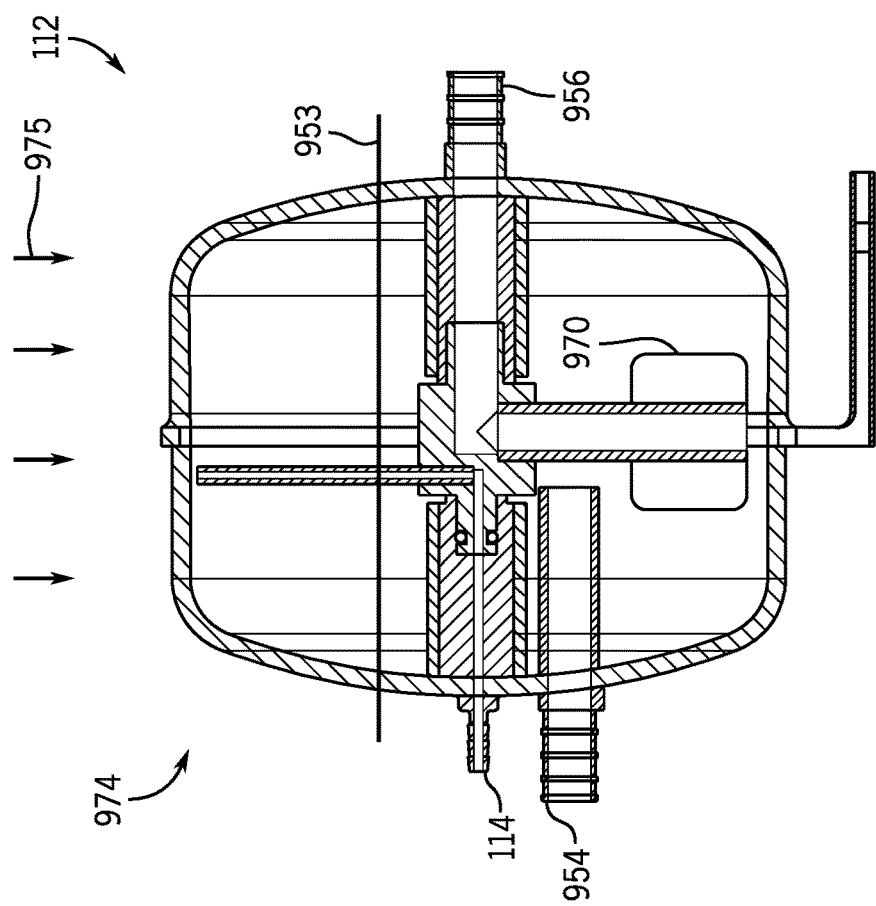
Figure 18C:
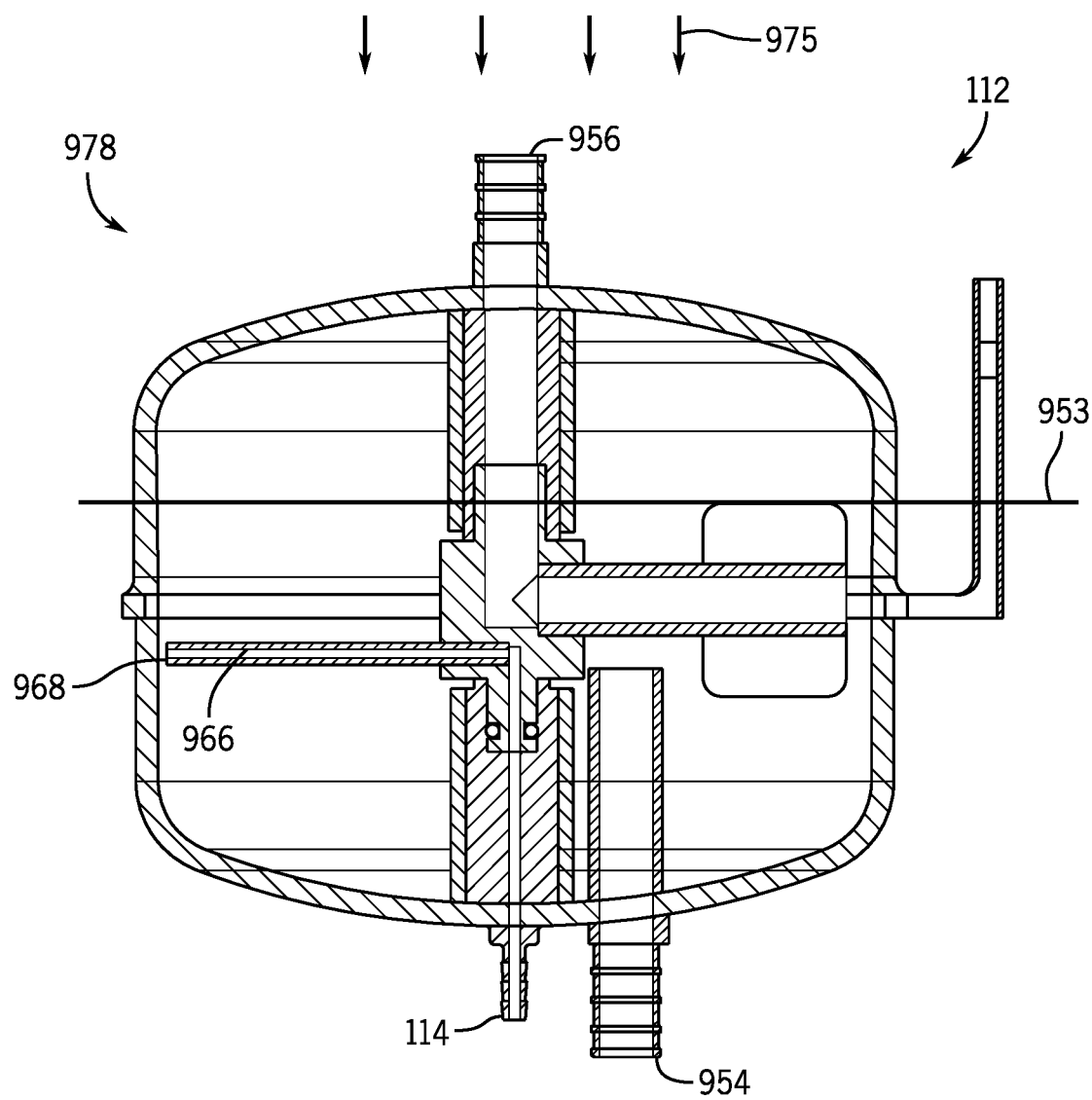
Figure 20:
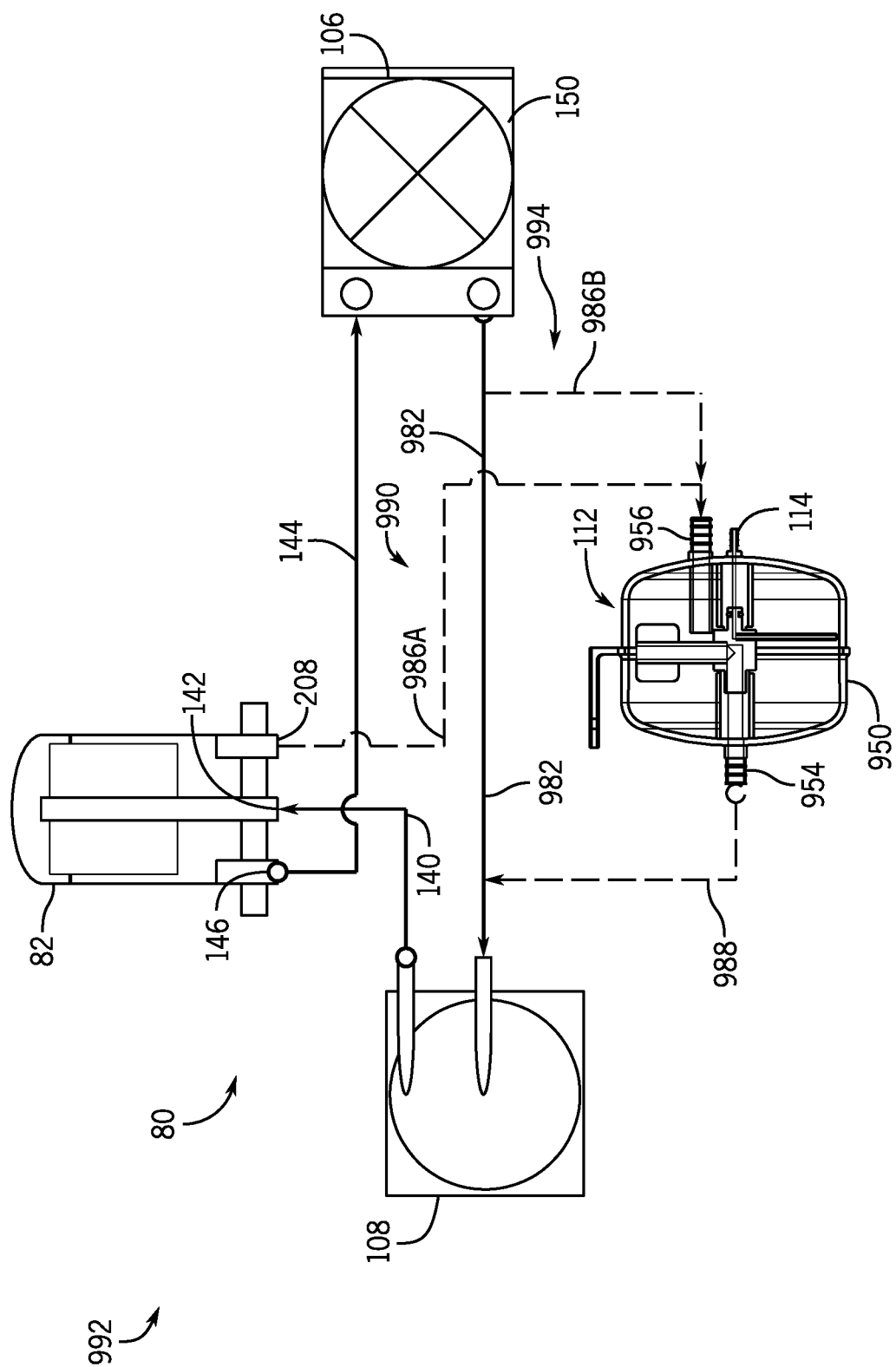
Figure 21:
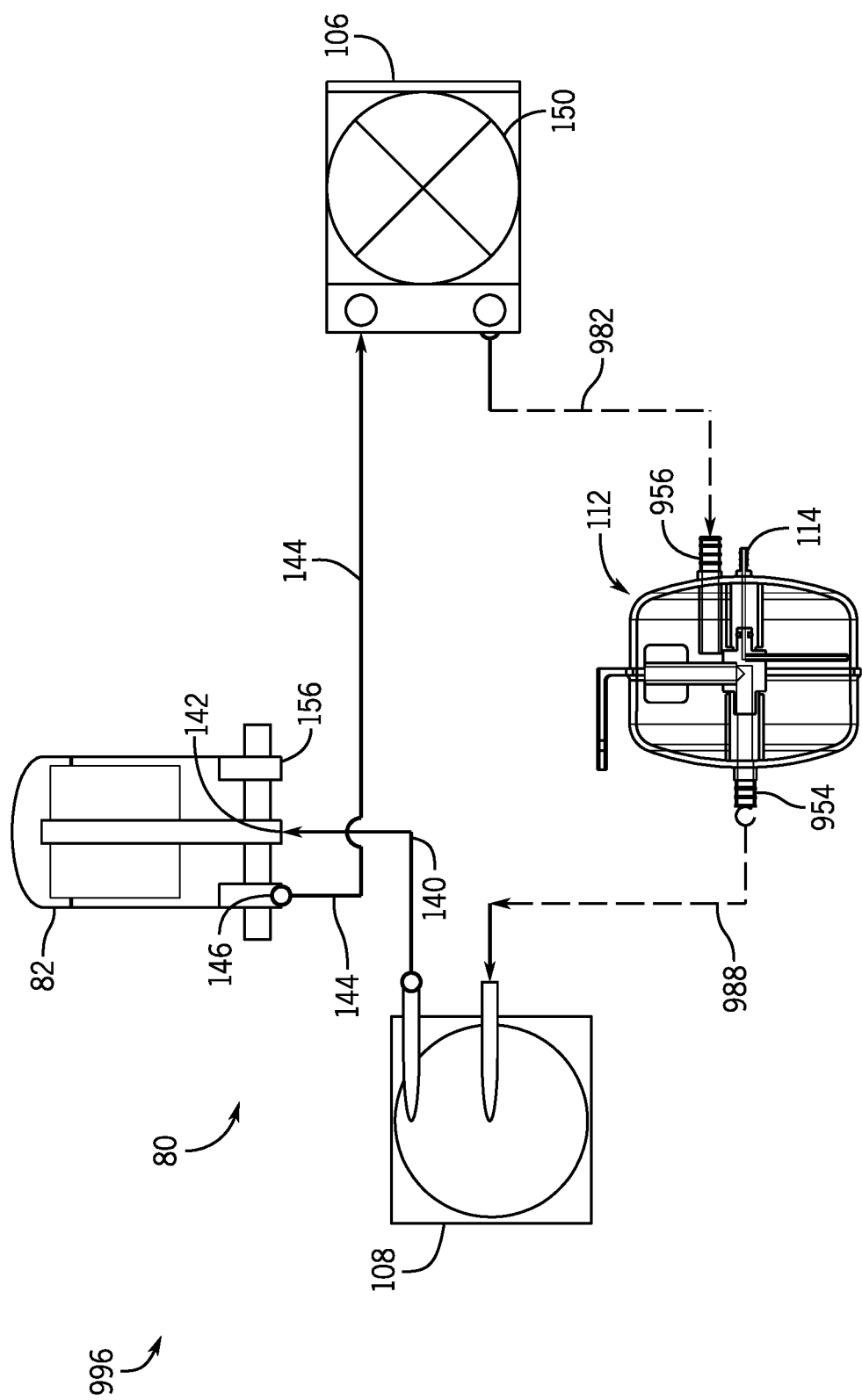
Figure 22:
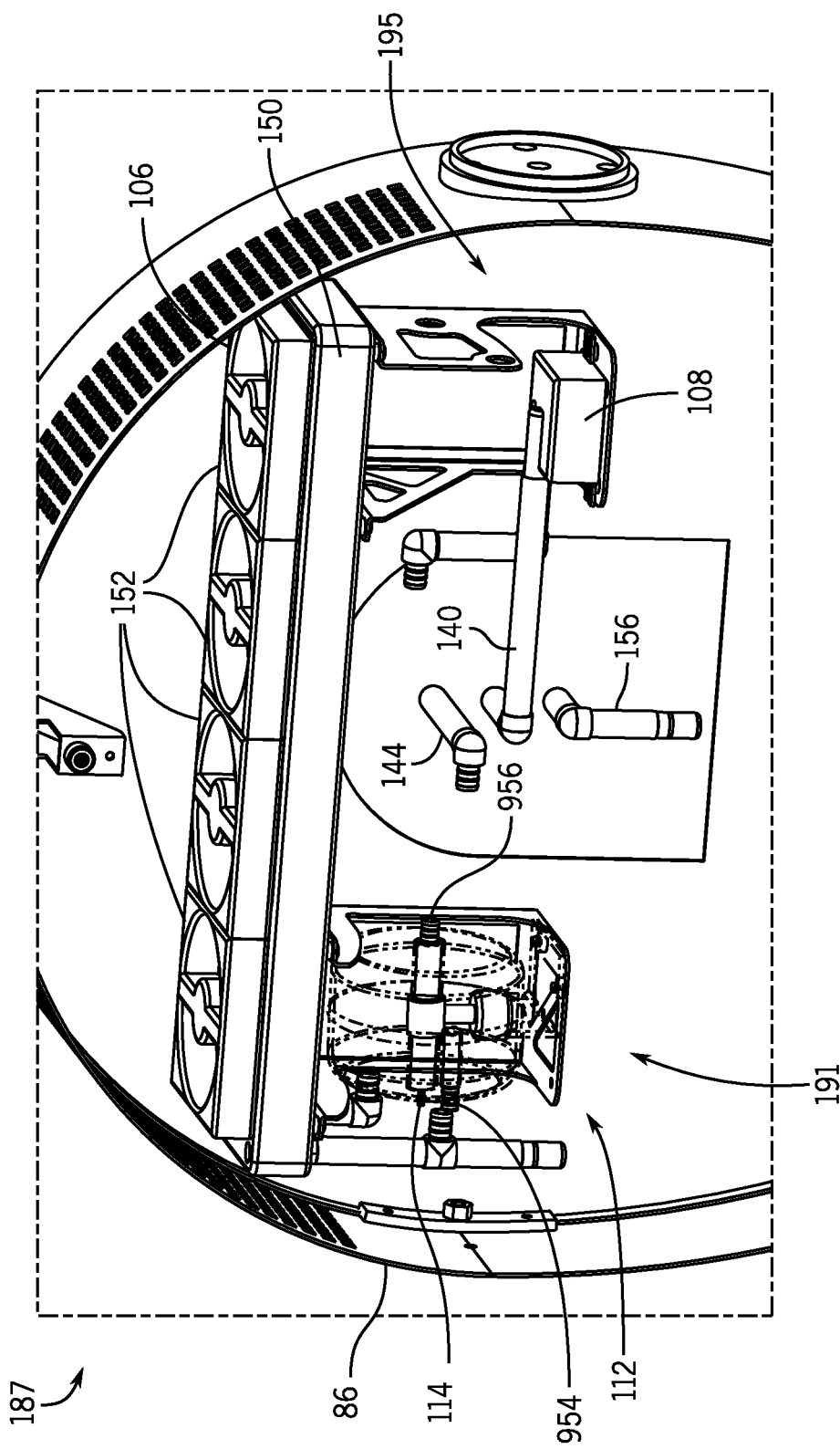
Figure 23:
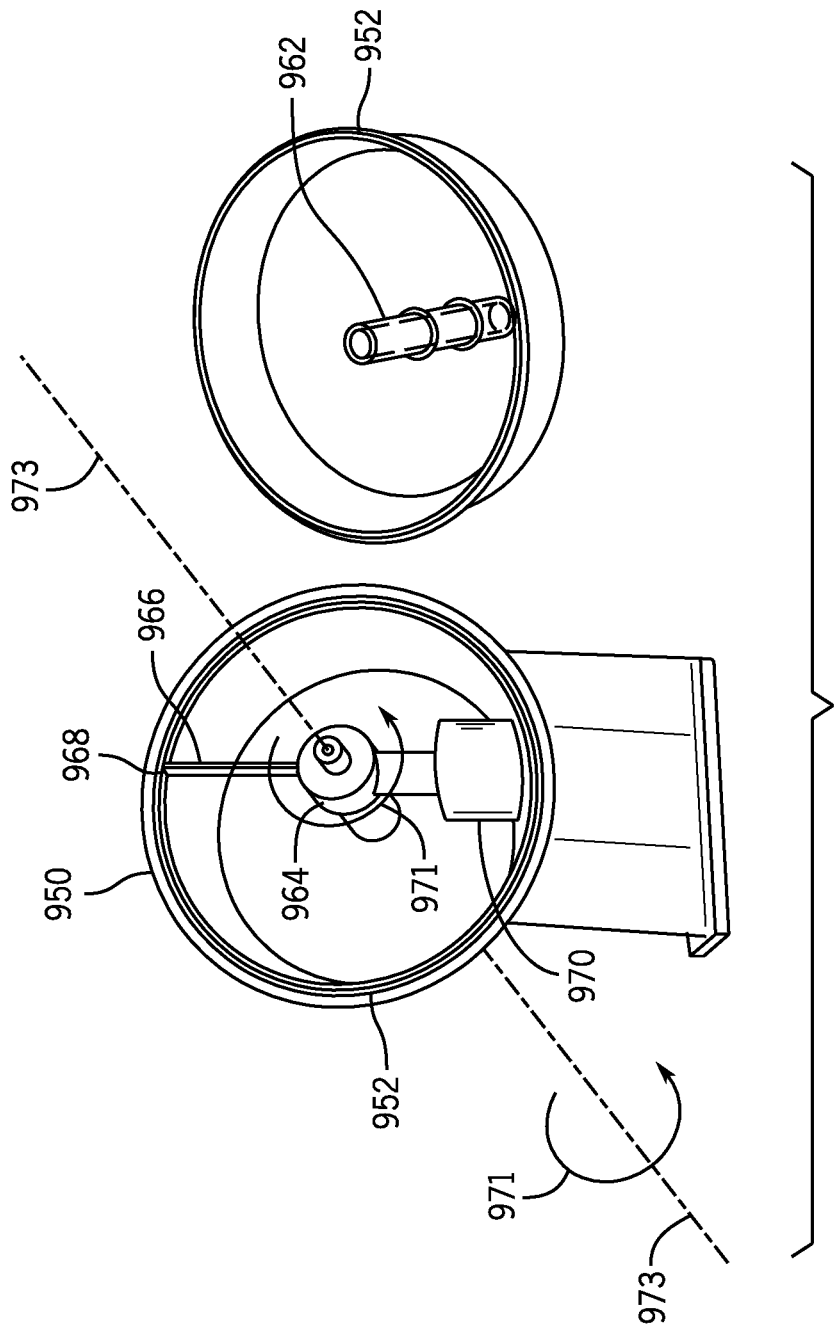
Figure 24:
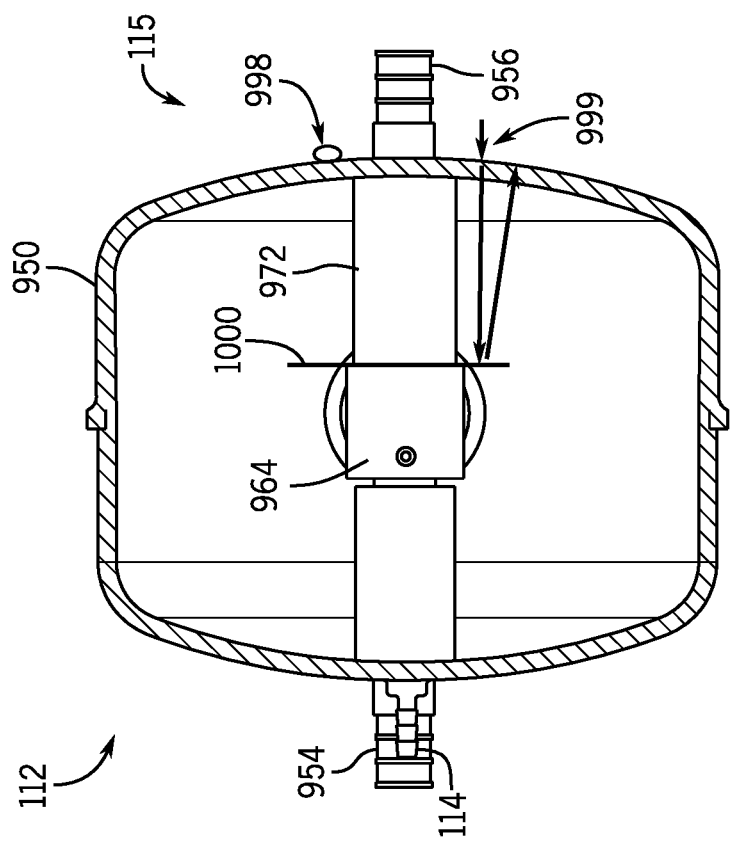
Figure 25:
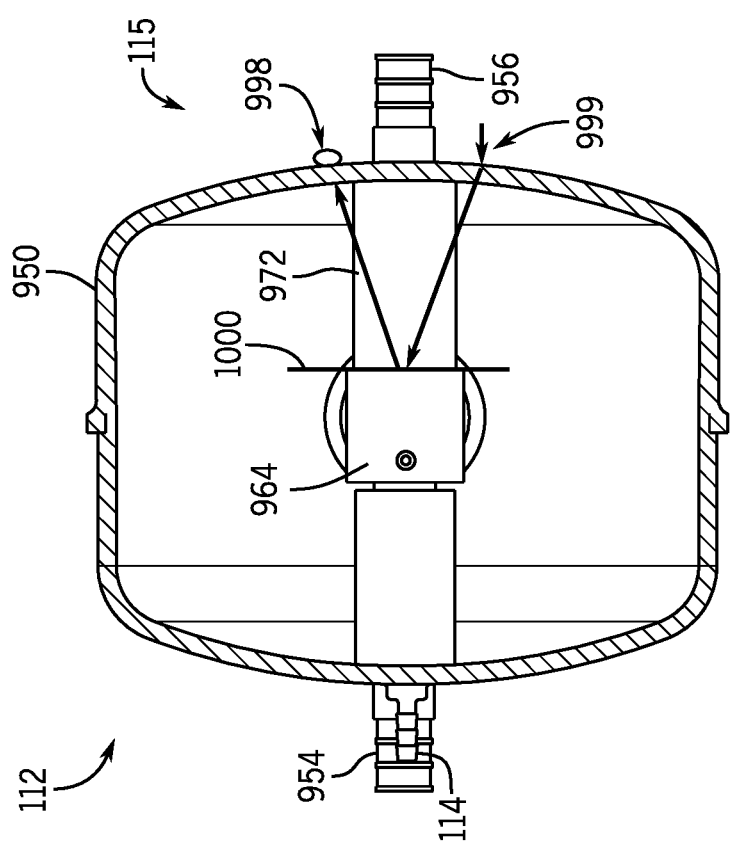
Figure 26:
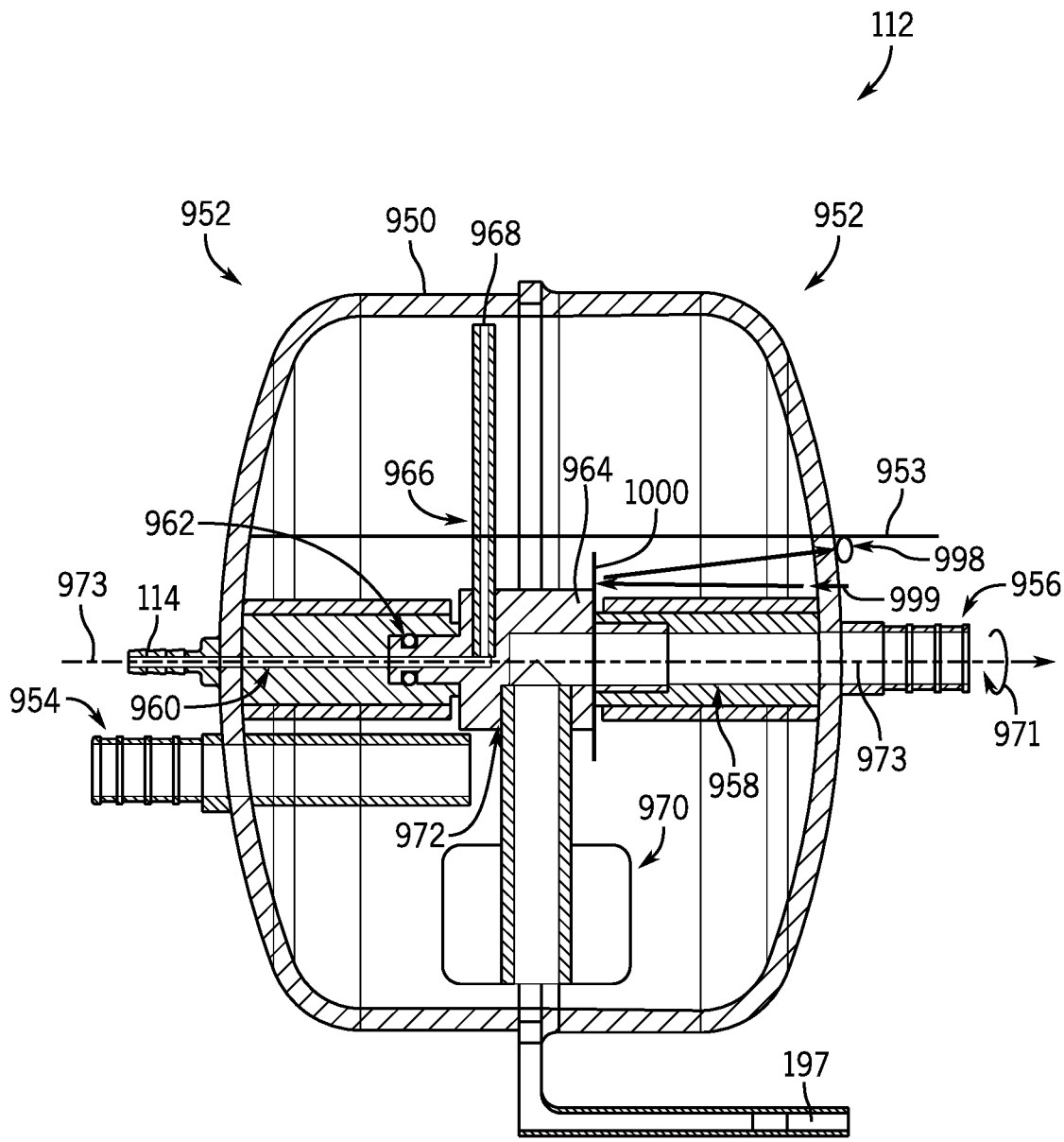
Figure 27A:
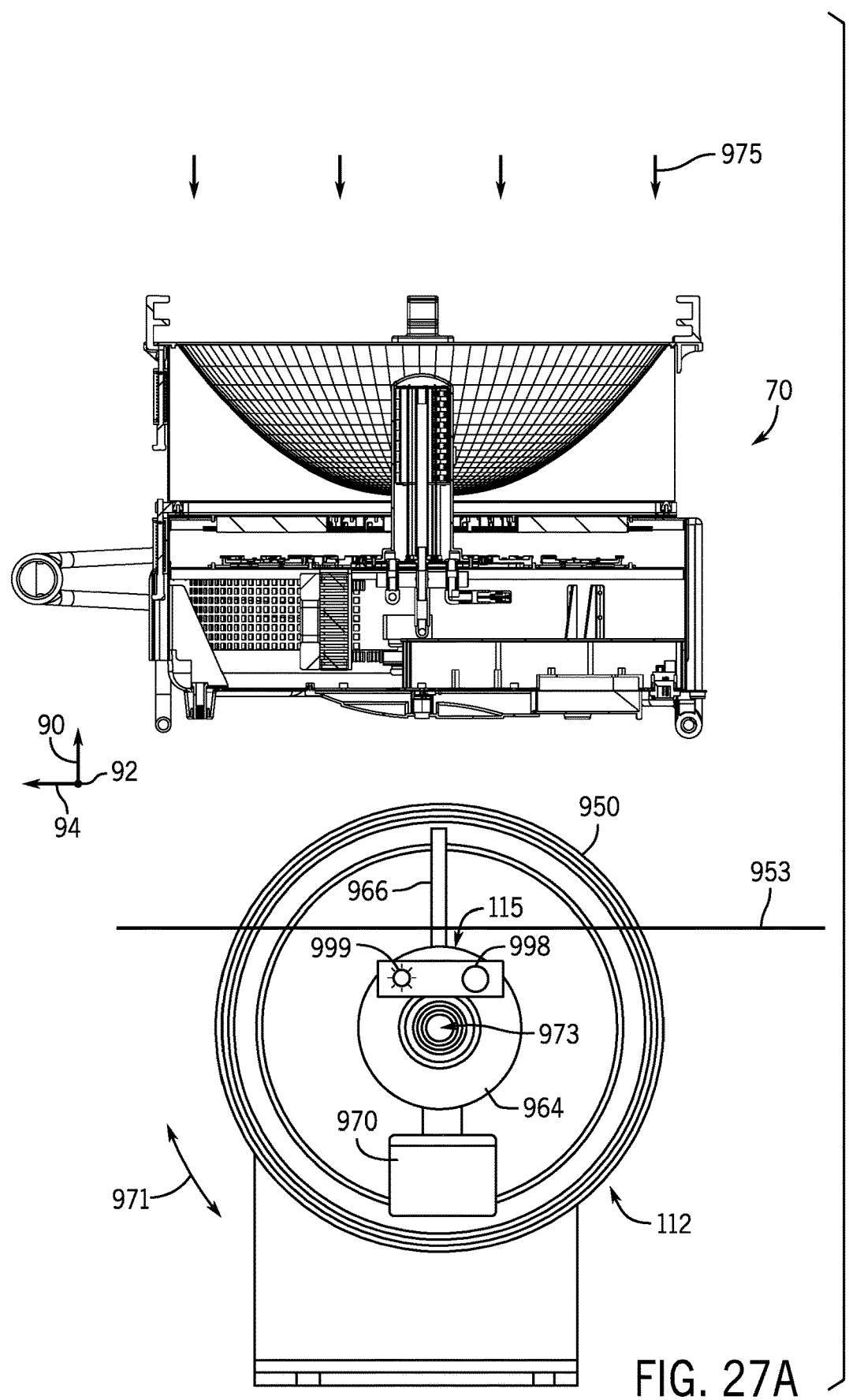
Figure 27B:
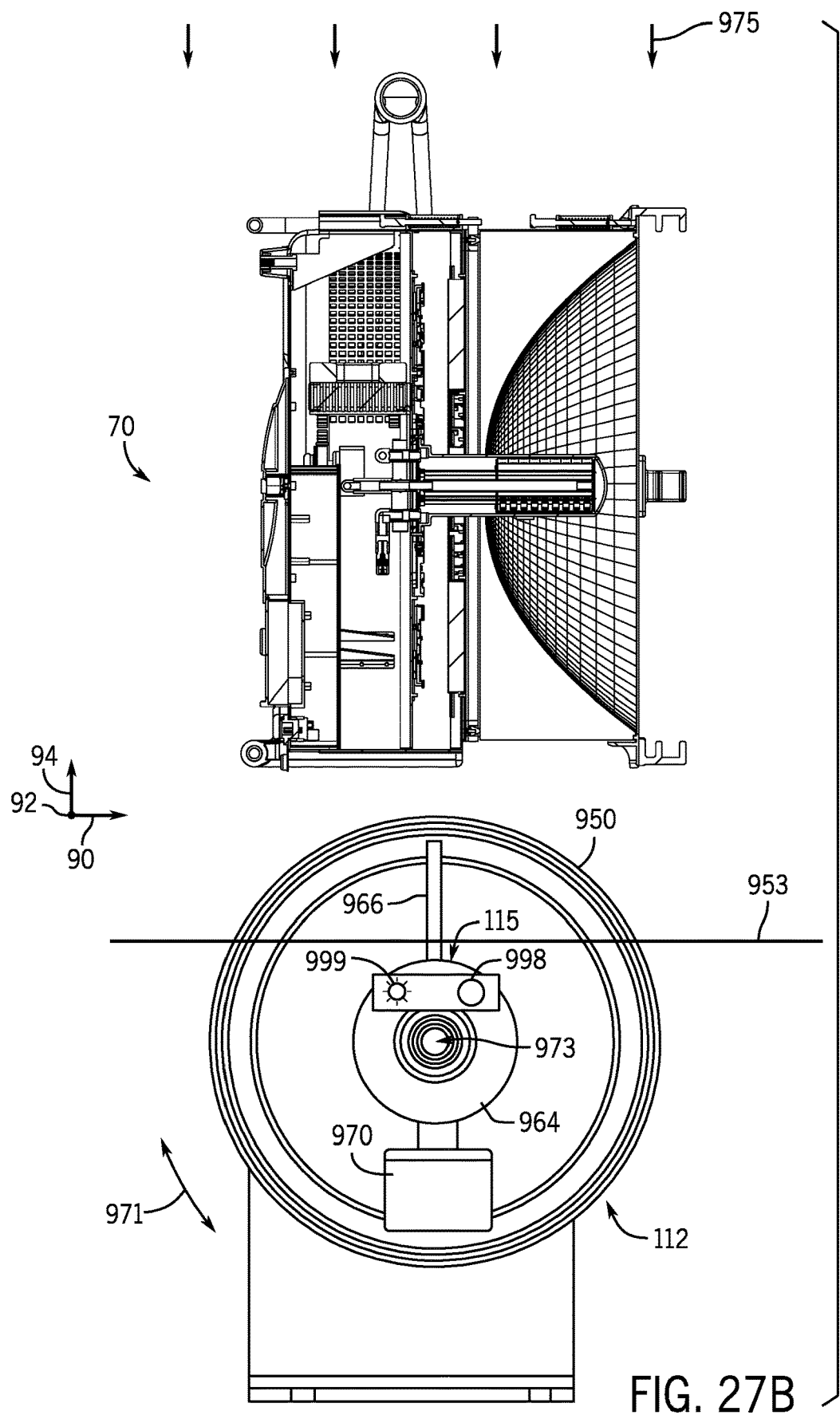
Figure 27C:
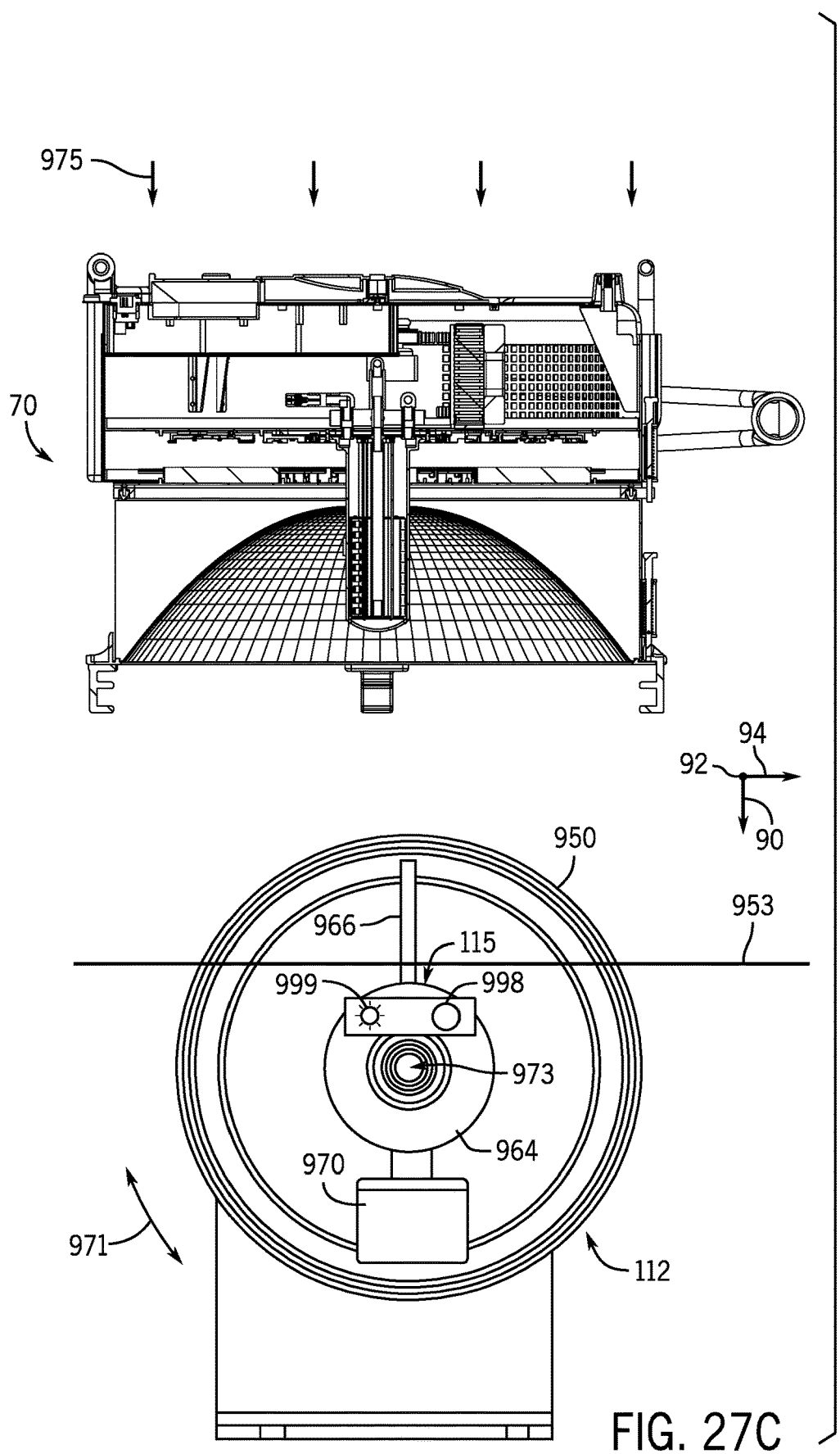

FIG. 12 includes side views of the cooling system of FIG. 7, in accordance with one or more current embodiments;

FIG. 13 includes perspective views of the cooling system of FIG. 7 coupled to light directing assemblies, in accordance with one or more current embodiments;

FIG. 14 is a perspective cross-sectional view of another embodiment of a lighting assembly having the LED assembly and the cooling system of FIG. 1, in accordance with one or more current embodiments;

FIG. 15 is a perspective view of the lighting assembly of FIG. 14, in accordance with one or more current embodiments;

FIG. 16 is a flow diagram of an embodiment of a method for controlling the cooling system of FIGS. 1-15, in accordance with one or more current embodiments;

FIG. 17 is a cross-sectional view of the debubbler system of FIG. 1, in accordance with one or more current embodiments;

FIG. 18A is a cross-sectional view of the debubbler system of FIG. 1 in a first orientation having a weighted member at the bottom of the debubbler system of FIG. 1, in accordance with one or more current embodiments;

FIG. 18B is a cross-sectional view of the debubbler system of FIG. 1 in a second orientation having an inlet oriented opposite a direction of a gravity vector, in accordance with one or more current embodiments;

FIG. 18C is a cross-sectional view of the debubbler system of FIG. 1 in a third orientation, in which the outlet is positioned opposite a gravity vector, in accordance with one or more current embodiments;

FIG. 19 is a flow diagram of a first arrangement of the cooling system of FIG. 1, including the debubbler system of FIG. 1, in accordance with one or more current embodiments;

FIG. 20 is a flow diagram of a second arrangement of the cooling system of FIG. 1, including the debubbler system of FIG. 1, in accordance with one or more current embodiments;

FIG. 21 is a flow diagram of a third arrangement of the cooling system of FIG. 1, including the debubbler system of FIG. 1, in accordance with one or more current embodiments;

FIG. 22 is a schematic diagram of cooling system of FIG. 1, including the debubbler system of FIG. 1, in accordance with one or more current embodiments;

FIG. 23 is a perspective view of an inside of an enclosure of the debubbler system of FIG. 1, in accordance with one or more current embodiments;

FIG. 24 is a cross-section view of the debubbler system of FIG. 1, including a fluid level sensor, in accordance with one or more current embodiments;

FIG. 25 is a cross-section view of the debubbler system of FIG. 1, including the fluid level sensor of FIG. 24, in accordance with one or more current embodiments;

FIG. 26 is a cross-section view of the debubbler system of FIG. 1, including the fluid level sensor of FIG. 24, in accordance with one or more current embodiments;

FIG. 27A is a schematic diagram of the lighting assembly of FIG. 1 oriented in an upward position, in accordance with one or more current embodiments;

FIG. 27B is a schematic diagram of the lighting assembly of FIG. 1 oriented in a horizontal position, in accordance with one or more current embodiments; and FIG. 27C is a schematic diagram of the lighting assembly of FIG. 1 oriented in a downward position, in accordance with one or more current embodiments.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment," "an embodiment," or "some embodiments" of the present disclosure are not intended to be interpreted as excluding the existence of additional embodiments that also incorporate the recited features.

While the following discussion is generally provided in the context of a cooling system for an LED assembly for a lighting system, it should be understood that the embodiments disclosed herein are not limited to such lighting contexts. Indeed, the systems, methods, and concepts disclosed herein may be implemented in a wide variety of applications. The provision of examples in the present disclosure is to facilitate explanation of the disclosed techniques by providing instances of real-world implementations and applications. It should be understood that the embodiments disclosed herein may be useful in many applications, such as electronics (e.g., mobile devices, processors, memory devices, and so forth), food processing systems, transportation systems, and/or other industrial, commercial, and/or electronic systems for which the reduction of heat may improve cooling and device performance and longevity.

As discussed above, conventional cooling techniques for electronic systems, such as lighting systems, may not sufficiently cool. For example, existing cooling techniques for high intensity LED lighting instruments may suffer from certain drawbacks. As an example, cooling techniques employing cooling fluid may face some challenges because as cooling fluid is used to facilitate heat dissipation of the LED lighting instrument, the cooling fluid may be subject to different temperatures, which may decrease and/or increase the pressure of the cooling fluid in constant volumes. When the pressure increases inside the conduits or components that receive the cooling fluid, the pressure exerted on the walls of the conduits or components due to the expansion of air and coolant fluid may damage the walls of the conduits and components.

While manufacturing the walls of the conduits or the components out of flexible and expandable materials may reduce the impact of this increase in pressure, such manufacturing practice may not eliminate the air bubbles that may result from the increase in pressure. Indeed, the fluctuation in pressure may create bubbles in coolant fluid flow paths, thereby affecting the efficiency of the cooling technique. For example, a pump (e.g., high speed centrifugal pump) driving cooling fluid through the coolant fluid flow paths may operate in an undesired manner (e.g., stop pumping coolant fluid) if the impeller cavity is filled with air (e.g., from the air bubbles). As another example, if a larger air bubble collects in the LED lighting instrument, the LED may not receive adequate cooling and thermally fail. Accordingly, existing systems may benefit from improvements to cooling of the LED lighting instrument by reducing bubbles in the coolant fluid flow paths, the implementation of which may be difficult to develop and coordinate in various systems generating high temperatures.

The presently disclosed embodiments included a debubbler system that includes a check valve that may reduce the internal pressure of the debubbler system and thereby reduce the air bubbles that may be present within the debubbler system. The debubbler system may be positioned along a cooling circuit defining the flow of fluid, for example, used to cool an electronic device. The cooling circuit may define the flow of fluid between an electronic system, the debubbler system, a heat exchanger, a pump, and/or any other suitable devices. In this manner, as the pump controls the flow of fluid, the debubbler system may remove the air bubbles in the fluid to improve the overall cooling efficiency of the electronic device. The debubbler system may reduce pressure from the overall cooling circuit by allowing pressure built up within the cooling circuit to vent out of the debubbler system, as discussed in detail below. Removing pressure from the cooling circuit may be difficult because the cooling circuit may be a closed system. In this manner, the debubbler system may prevent changes in volume (e.g., expansion and contraction) resultant from changes in pressure by allowing for the vent of air bubbles and pressure, as discussed in detail below.

As used herein, "debubbler system" may refer to a device for removing bubbles from a fluid system, in accordance with embodiments of the present disclosure. For example, debubbler system may refer to a tri-functional coolant chamber that may allow for fluid thermal expansion, may capture bubbles and air in system, and vent and/or compensate for pressure changes. The debubbler system may be non-pressurized or pressurized (e.g., to about 6 pounds per square inch (psi)). In the case of the debubbler system being pressurized, the debubbler system may be compressible and expandable, for example, due to the enclosure of the debubbler system being of a compressible material. As used herein, "fluid" or "coolant fluid" may refer to a substance used for cooling purposes that has no fixed shape and yields to external pressures. As used herein, "bubble" or "air bubble" may refer to a globule of one substance (e.g., a gas) in another (e.g., liquid), such as an air bubble in the coolant fluid. While the embodiments below are discussed in the context of "air bubbles," it should be understood that the present embodiments may be applied to bubbles of any gaseous substance.

Furthermore, the embodiments discussed herein include a discussion of various flow paths (e.g., fluid connections or coolant circuits). The flow paths (e.g., fluid connections or coolant circuits) may include multiple segments fluidly coupling two components of the cooling system. Furthermore, the segments are each configured to direct coolant fluid. In certain embodiments, the segments are configured to direct coolant fluid with no intervening components between the illustrated components. For example, each illustrated segment of each illustrated coolant fluid flow path may include a first end and a second end configured to form a direct fluid connection (e.g., via an annular conduit) between two components. However, in certain embodiments, intervening components may be present between the two illustrated components.

During transportation of the debubbler system (e.g., after manufacturing the debubbler system), preventing air from entering the main cooling system may help preserve functionality of the cooling system by preventing the accumulation of air bubbles. Air bubbles in the cooling system may be undesirable because when an air bubble sits over a lighting element, the coolant does not flow over the lighting element, which could lead to overheating or cooling inefficiencies. Despite messages (for a desired orientation for the debubbler system) on the packaging used to transport the debubbler system or on the debubbler system, transporting companies may fail to follow the message, resulting in harm to the lighting system. To improve the transportability and versatility of the lighting system by allowing for a number of orientations or positions during transportation and use, present embodiments for the debubbler system include one or more designs for preventing air from exiting the debubbler system and entering the lighting assembly when the debubbler system is in any number of orientations, for example, during use or transportation.

Lighting System

Turning now to the drawings, FIG. 1 is a perspective view of an embodiment of a lighting assembly 70 having a cooling system 80 and the LED assembly 82, in accordance with one or more current embodiments. The lighting assembly 70 includes a reflector 85 (e.g., a parabolic reflector) configured to reflect light emitted by the LED assembly 82. For example, the light emitted by the LED assembly 82 may pass through the fluid disposed between the LED assembly 82 and the enclosure 88, through the enclosure 88, and may be reflected by the reflector 84 outwardly. The reflector 84 is coupled to a chassis 86 (e.g., a housing) of the lighting assembly 70. In certain embodiments, the LED assembly 82, the enclosure 88, and/or other portions of the cooling system 80 may be coupled to the chassis 86. For example, as described in greater detail below, a heat exchanger and/or pump of the cooling system 80 may be coupled to the chassis 86. To facilitate illustration, FIG. 1 includes a coordinate system fixed to the lighting assembly and defining a longitudinal axis 90, a lateral axis 92, and a vertical axis 94.

Cooling System

Figure 2:
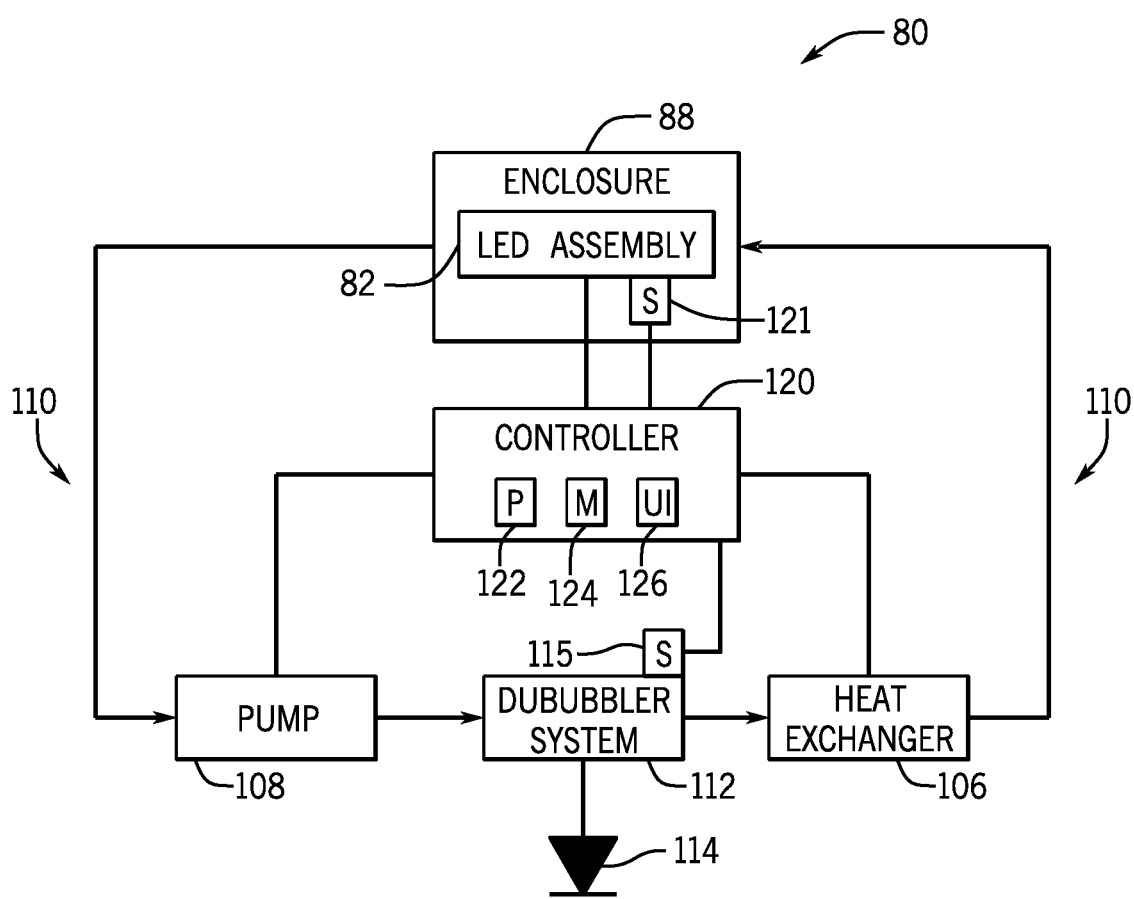
FIG. 2 is a schematic diagram of an embodiment of the cooling system of FIG. 1 configured to immersively and actively cool the LED assembly of FIG. 1, in accordance with one or more current embodiments.

FIG. 2 is an exemplary schematic diagram of a cooling system 80 of FIG. 1 configured to actively cool the LED assembly 82 of FIG. 2, in accordance with one or more current embodiments. The cooling system 80 includes an enclosure 88 configured to at least partially enclose and/or house the LED assembly 82 and a heat exchanger 106 fluidly coupled to the enclosure 88. The cooling system 80 also includes a pump 108 configured to circulate fluid (e.g., coolant, mineral oil, water, a hydrocarbon fluid, a silicon fluid, any suitable cooling fluid, or a combination thereof) along a cooling circuit 110 through the heat exchanger 106, through the enclosure 88, through and/or over the LED assembly 82, through a debubbler system 112, and back to the pump 108. In certain embodiments, the cooling system 80 may include the LED assembly 82 or a portion thereof.

The LED assembly 82 may be any assembly including one or more LEDs. For example, to provide lighting for applications such as television and theater sets, film sets, tradeshows, and any one of the range of permanent, semi-permanent, and temporary settings, the LED assembly 82 may include multiple LEDs configured to emit light. While emitting light, the LEDs may produce heat and a temperature of a surrounding area (e.g., an area adjacent to the LED assembly 82 and/or within/adjacent to the enclosure 88) may generally increase.

During operation, the cooling system 80 is configured to absorb the heat generated by the LED assembly 82 and to transfer the heat to ambient air. For example, as the pump 108 circulates the fluid through the enclosure 88 and/or through the LED assembly 82, the fluid may absorb the heat generated by the LED assembly 82. The heat exchanger 106 may include a radiator and/or fan(s) configured to actively draw ambient air toward/across the heat exchanger 106 to cool the fluid traveling through the heat exchanger 106 and along the cooling circuit 110, as described below. In certain embodiments, the heat exchanger 106 may include a second fluid (e.g., in addition to or in place of the ambient air) configured to exchange heat with the fluid flowing along the cooling circuit 110.

The pump 108 may be a variable speed pump configured to circulate the fluid through the cooling circuit 110. In certain embodiments, a housing of the pump 108 may include a flexible diaphragm configured to expand and/or contract based on a volume of the fluid flowing along the cooling circuit 110. For example, as the fluid absorbs heat at and from the LED assembly 82, the fluid may expand (e.g., thermal expansion). As the fluid flows from the LED assembly 82 and the enclosure 88, the flexible diaphragm of the pump 108 may expand to allow the increased volume of fluid to pass through the pump without affecting the flowrate of the fluid through the pump 108 and along the cooling circuit 110. In some embodiments, the flexible diaphragm of the pump 108 may be a service panel configured to allow access to internal portions of the pump 108. As described in greater detail below, in certain embodiments, the flexible diaphragm may be located elsewhere along the cooling circuit 110 (e.g., in addition to or in place of be located at the pump 108) to facilitate thermal expansion of the fluid in the cooling circuit 110.

The debubbler system 112 may include a hollow enclosure having an inlet that receives fluid along the cooling circuit 110 to remove air bubbles that build in the fluid as the fluid flows along the cooling circuit 110. The debubbler system 112 may include a check valve 114 that restricts the flow of fluid to one direction. In this case, the check valve may allow fluid (e.g., air) out of the debubbler system 112, such that the check valve prevents fluid (e.g., air) from entering the debubbler system. The debubbler system 112 may also include an outlet that allows the fluid to exit the debubbler system to flow to another component along the cooling circuit 110. The debubbler system may also include a fluid level sensor 115 to monitor the fluid level inside the debubbler system 112. A detailed discussion of the debubbler system 112 is provided below with respect to FIGS. 17-27.

The LED assembly 82 is configured to emit light, which may pass through the fluid circulating between the LED assembly 82 and the enclosure 88 and through the enclosure 88. As such, the LED assembly 82 is configured to provide lighting for the various applications described herein (e.g., motion picture and television lighting and/or other applications that may benefit from high intensity lighting) while being cooled by the cooling system 80. The LEDs of the LED assembly 82 may include varied/multiple configurations. For example, the LED assembly 82 may include chip scale packaging (CSP) arrays (e.g., bi-color CSP arrays). CSP technology may benefit from high density of LED chips in a specified area (e.g., per square inch/centimeter), and CSP technology may utilize different colors of individual LEDs. For example, CSP technology may include a five color configuration (e.g., warm white, cool white, red, green, and blue), a four color configuration (e.g., white, red, green, and blue), a three color configuration (e.g., red, green, and blue), a bi-color white configuration (e.g., warm white and cool white), a single white configuration, and/or a single color configuration.

In some embodiments, the LED assembly 82 may include single color chip on board ("COB") arrays. The COB arrays may include a relatively large number of LEDs bonded to a single substrate and a layer of phosphor placed over the entire array. An advantage of COB technology is very high LED density per specified area (e.g., per square inch/centimeter). Additionally or alternatively, the LED assembly 82 may include discrete LEDs.

The cooling system 80 includes a controller 120 configured to control and/or receive signals from the LED assembly 82, the heat exchanger 106, the pump 108, the debubbler system 112 (e.g., fluid level sensor 115), or a combination thereof. For example, the controller 120 may control some or all LEDs of the LED assembly 82 to cause the LEDs to emit light. Additionally or alternatively, the controller 120 may control operation of the heat exchanger 106 to cause the heat exchanger 106 to exchange more or less heat between the fluid and the ambient air. For example, the controller 120 may control fans of the heat exchanger 106 to control an air flow rate through/over the heat exchanger 106. In certain embodiments, the fans of the heat exchanger 106 may be controlled via pulse width modulated (PWM) power. The fans may be controlled based on the temperature at the LED assembly 82. In some embodiments, to reduce a noise output of the fans of the heat exchanger 106, the controller 120 may operate the fans when cooling of the fluid by other means (e.g., via the radiator without active airflow) is insufficient.

As illustrated, the cooling system 80 may include a sensor 121 disposed at the LED assembly 82 and configured to output a signal (e.g., an input signal into the controller 120)

indicative of the temperature at the LED assembly 82 and/or a temperature of the fluid adjacent to the LED assembly 82. The sensor 121 may be any suitable temperature/thermal sensor, such as a thermocouple. In certain embodiments, the cooling system 80 may include other thermal sensor(s) disposed within the fluid and configured to output a signal indicative of a temperature of the fluid (e.g., within the enclosure 88) and/or disposed at the enclosure 88 and configured to output a signal indicative of a temperature at the enclosure 88.

Further, the controller 120 may control operation of the pump 108 to cause the pump 108 to circulate the fluid along the cooling circuit 110 at particular flowrates. For example, based on the temperature at the LED assembly 82 and/or at the enclosure 88 (e.g., based on the signal indicative of the temperature at the LED assembly 82 received from the sensor 121), the controller 120 may be configured to output a signal (e.g., an output signal) to the pump 108 indicative of instructions to adjust the flowrate of the fluid flowing through the cooling circuit 110. Furthermore, the fluid level sensor 115 may be communicatively coupled to the controller 120. In certain embodiments, the controller 120 may be configured to output a signal (e.g., an output signal) to the pump 108 indicative of instructions to adjust the flowrate of the fluid flowing through the cooling circuit 110 based on a fluid level inside the debubbler system 112 (e.g., as determined by the fluid level sensor 115). For example, if the fluid level is below (or above) a fluid level threshold value as determined by the fluid level sensor 115, the controller 120 may be output a signal (e.g., an output signal) to the pump 108 indicative of instructions to increase (or decrease) the flowrate of the fluid flowing through the cooling circuit 110 to increase (or decrease) volume of fluid within the debubbler system 112.

As illustrated, the controller 120 includes a processor 122 and a memory 124. The processor 122 (e.g., a microprocessor) may be used to execute software, such as software stored in the memory 124 to control the cooling system 80 (e.g., for controller operation of the pump 108 to control the flowrate of fluid through the cooling circuit 110). Moreover, the processor 122 may include multiple microprocessors, one or more "general-purpose" microprocessors, one or more special-purpose microprocessors, and/or one or more application-specific integrated circuits (ASICS), or some combination thereof. For example, the processor 122 may include one or more reduced instruction set (RISC) or complex instruction set (CISC) processors.

The memory device 124 may include a volatile memory, such as random-access memory (RAM), and/or a nonvolatile memory, such as read-only memory (ROM). The memory device 124 may store a variety of information and may be used for various purposes. For example, the memory device 124 may store processor-executable instructions (e.g., firmware or software) for the processor 122 to execute, such as instructions for controlling the cooling system 80. In certain embodiments, the controller 120 may also include one or more storage devices and/or other suitable components. The storage device(s) (e.g., nonvolatile storage) may include ROM, flash memory, a hard drive, or any other suitable optical, magnetic, or solid-state storage medium, or a combination thereof. The storage device(s) may store data (e.g., measured temperatures at the LED assembly 82) in relational or non-relational data structures, instructions (e.g., software or firmware for controlling the cooling system 80), and any other suitable data. The processor 122 and/or the memory device 124, and/or an additional processor and/or memory device, may be located in any suitable portion of the system. For example, a memory device for storing instructions (e.g., software or firmware for controlling portions of the cooling system 80) may be located in or associated with the cooling system 80.

Additionally, the controller 120 includes a user interface 126 configured to inform an operator of the temperature at the LED assembly 82 and/or of the flowrate of the fluid through the cooling circuit 110. For example, the user interface 126 may include a display and/or other user interaction devices (e.g., buttons) configured to enable operator interactions. It is understood that FIG. 2 is intended to provide an exemplary schematic diagram of the cooling system 80, and the components of the cooling system 80 (such as the pump 108, the heat exchanger 106, the debubbler system 112, and the LED assembly 82) are not limited by the quantity and coupling as shown in FIG. 2, and instead, may be repositioned at various points along the cooling circuit 110.

Figure 3:
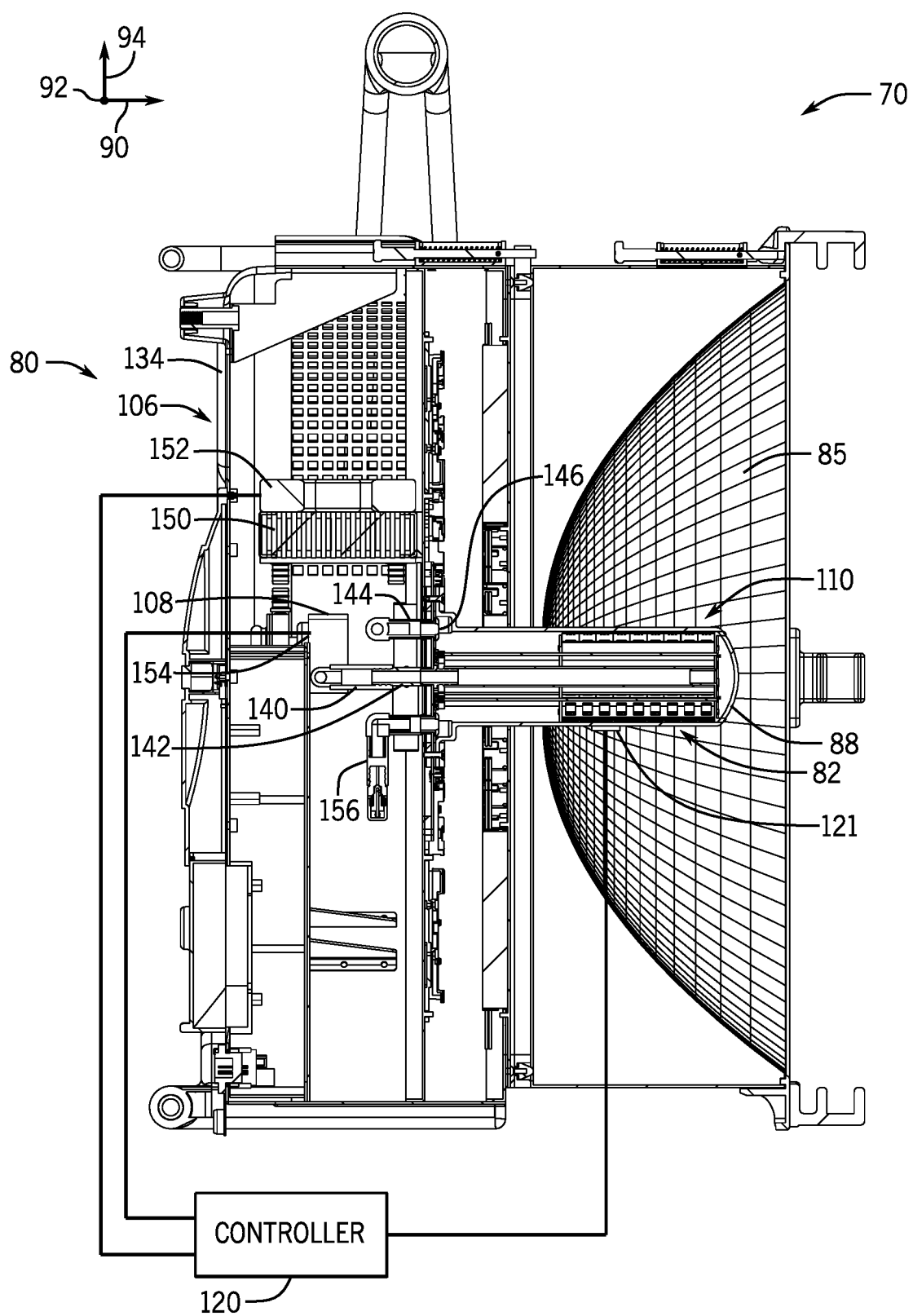
FIG. 3 is a cross-sectional view of the lighting assembly of FIG. 1 having the cooling system and the LED assembly, in accordance with one or more current embodiments.

FIG. 3 is a cross-sectional view of the lighting assembly 70 of FIG. 2 having the cooling system 80, in accordance with one or more current embodiments. As illustrated, the cooling system 80 includes the enclosure 88, the LED assembly 82 disposed in the enclosure 88, the heat exchanger 106 configured to exchange heat with the fluid, and the pump 108 configured to drive circulation of the fluid. Additionally and as illustrated, the cooling system 80 includes an inlet pipe 140 coupled to the pump 108 and to a fluid inlet 142 of the enclosure 88. Further, the cooling system 80 includes an outlet pipe 144 coupled to an outlet 146 of the enclosure 88 and to the heat exchanger 106. In certain embodiments, the inlet pipe 140 and/or the outlet pipe 144 may extend into the LED assembly 82 and/or into the enclosure 88.

As illustrated, the fluid inlet 142 may be disposed generally along a centerline of the enclosure 88 and the LED assembly 82. The pump 108 may be configured to drive the fluid from the inlet pipe 140, into the fluid inlet 142, generally along the centerline of the LED assembly 82 and the enclosure 88, into and along a gap between the LED assembly 82 and the enclosure (e.g., a gap where the fluid absorbs heat generated by the LED assembly 82), out of the fluid outlet 146, and into the outlet pipe 144 (e.g., along the cooling circuit 110). After absorbing heat at the LED assembly 82, the fluid may circulate through the heat exchanger 106 and return to the pump 108. At the heat exchanger 106, the fluid rejects the heat absorbed at the LED assembly 82. For example, the heat exchanger 106 includes a radiator 150 and fans 152 configured to draw air (e.g., ambient air) across the radiator 150. The air drawn across the radiator 150 may absorb heat from the fluid flowing through the radiator 150 (e.g., heat transferred from the fluid to the radiator 150), thereby cooling the fluid for subsequent circulation along the cooling circuit 110 and back through the LED assembly 82 and the enclosure 88.

In certain embodiments, the heat exchanger 106 may not expel all the heat absorbed by the fluid at the LED assembly 82, such that the fluid retains at least some of the heat absorbed at the LED assembly 82. As such, a temperature of the fluid along the cooling circuit 110 (e.g., an average temperature) may increase, thereby increasing a volume of the fluid. The cooling system 80 may include a flexible membrane 154 at the pump 108 configured to expand due to heating of the fluid and to contract due to cooling of the fluid (e.g., to accommodate volumetric changes of the fluid along the cooling circuit 110). In certain embodiments, the flexible membrane 154 may be included elsewhere within the cooling system 80.

The cooling system 80 may include a valve 156 fluidly coupled to the cooling circuit 110. The valve 156 may be configured to bleed air and/or fluid from the cooling circuit 110, such as when fluid is added to the cooling circuit 110 (e.g., the valve 156 may be a bleed valve). Additionally or alternatively, fluid may be added to the cooling circuit 110 via the valve 156 (e.g., the valve 156 may include a fill valve). In certain embodiments, the cooling system 80 may include multiple valves 156 with a first valve 156 being a bleed valve and a second valve 156 being a fill valve.

As described above, the controller 120 may be configured to control the LED assembly 82, the heat exchanger 106, the pump 108, the debubbler system 112, or a combination thereof. For example, the controller 120 may control some or all LEDs of the LED assembly 82 to cause the LEDs to emit light. Additionally, the controller 120 may control a rotation rate of the fans 152 and/or a flow rate of the fluid along the cooling circuit 110. For example, based on feedback received from the sensor 121 at the LED assembly 82 (e.g., the temperature at the LED assembly 82), the controller 120 may control the rotation rate of the fans 152 and/or the flow rate of the fluid. More specifically, in response the temperature at the LED assembly 82 being greater than a target temperature and a difference between the temperature at the LED assembly 82 and/or the target temperature exceeding a threshold value, the controller may increase the rotation rate of the fans 152 and/or may increase the flow rate of the fluid. In response the temperature at the LED assembly 82 being less than the target temperature and the difference between the temperature at the LED assembly 82 and/or the target temperature exceeding a threshold value, the controller may decrease the rotation rate of the fans 152 and/or may decrease the flow rate of the fluid.

Figure 4:
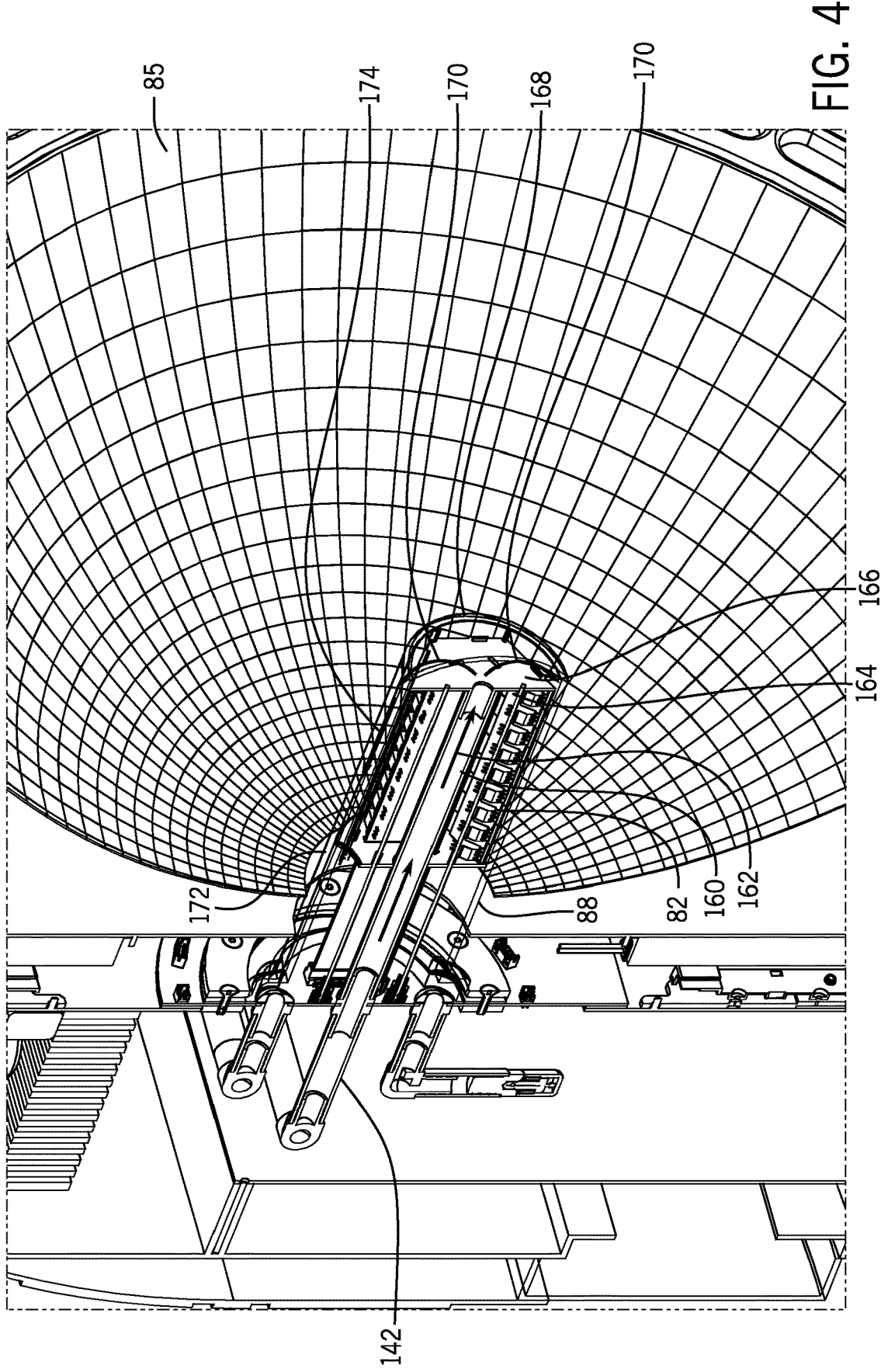
FIG. 4 is a perspective cross-sectional view of the lighting assembly of FIG. 1 having the cooling system and the LED assembly, in accordance with one or more current embodiments.

FIG. 4 is a perspective cross-sectional view of the lighting assembly 70 of FIG. 2 having the cooling system 80, in accordance with one or more current embodiments. As illustrated, the fluid of the cooling system 80 is configured to flow from the inlet pipe 140, through the fluid inlet 142, and through an inner annular passage 160 formed within the LED assembly 82 (e.g., in a direction 162). As such, the fluid enters the LED assembly 82 as a chilled fluid. The inner annular passage 160 may be coupled to the fluid inlet 142 and to an end 164 of the LED assembly 82. From the inner annular passage 160, the fluid may circulate through an end passage 166 formed between the end 164 of the LED assembly 82 and an end 168 of the enclosure 88, as indicated by arrows 170. From the end passage 166, the fluid circulates into an outer annular passage 172 formed between the LED assembly 82 and the enclosure 88, as indicated by arrow 174. As the fluid flows through the outer annular passage 172, the fluid absorbs heat generated by the LED assembly 82. From the outer annular passage 172, the fluid exits the enclosure 88 through the fluid outlet 146 and flows into the outlet pipe 144. As such, the fluid exits the enclosure 88 as a heated fluid. After passing through the heat exchanger 106 and the pump 108 of the cooling system 80, the fluid circulates back through the LED assembly 82 and the enclosure 88 to continue cooling the LED assembly 82.

The lighting assembly 70 is a side emission configuration of the lighting assembly, such that the lighting assembly 70 is configured to emit light radially outwardly (e.g., from sides of the lighting assembly 70) and through the fluid and the enclosure 88. As described in greater detail below in reference to FIGS. 14 and 15, the cooling system 80 may include a front emission configuration of the lighting assembly, such as in place of or in addition to the side emission configuration of FIGS. 2-5.

Figure 5:
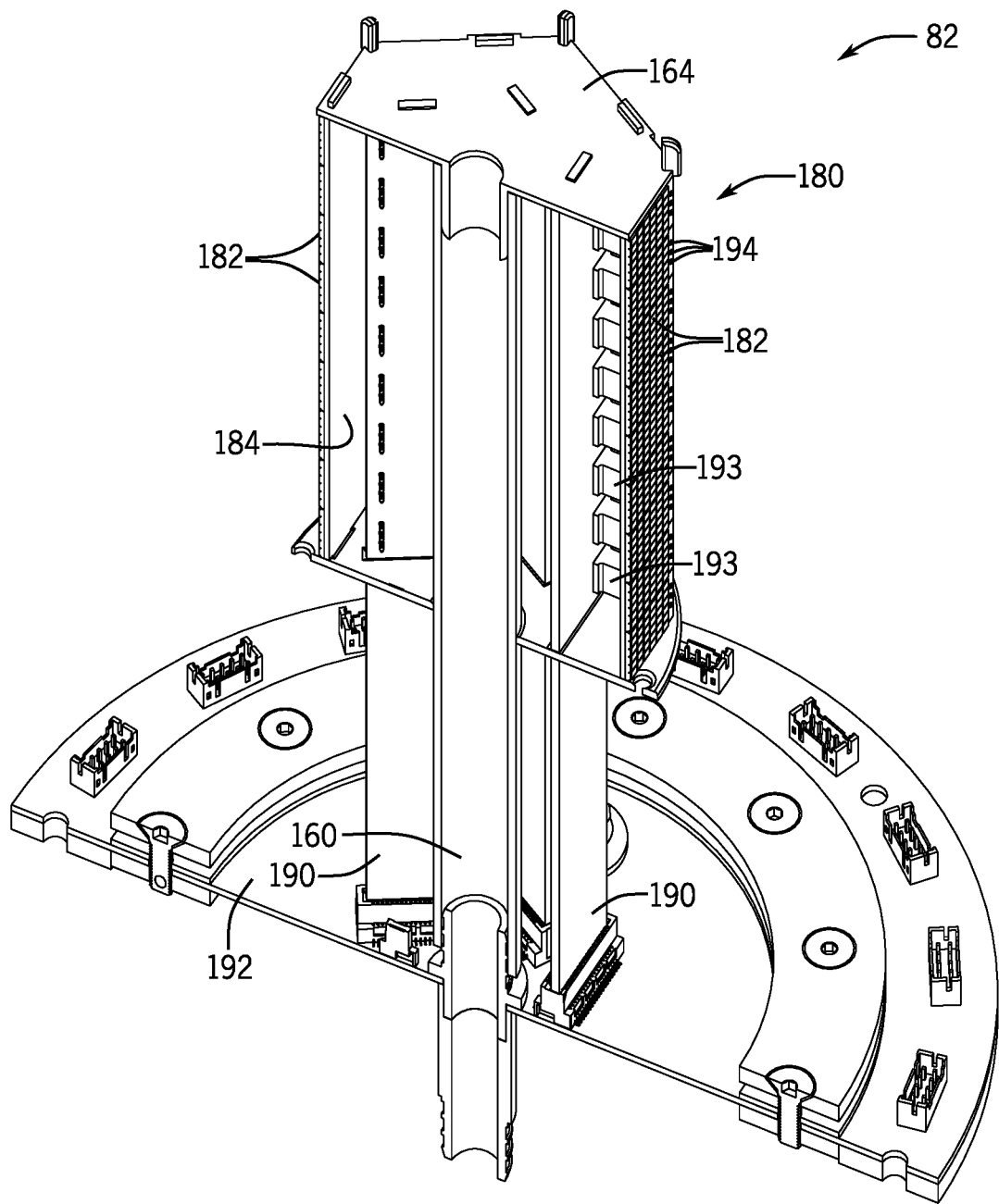
FIG. 5 is a perspective view of the LED assembly of FIG. 1, in accordance with one or more current embodiments.

FIG. 5 is a perspective view of the LED assembly 82 of FIG. 2, in accordance with one or more current embodiments. As illustrated, the LED assembly 82 includes a tower 180 and LED arrays 182 mounted to the tower 180. As illustrated, the tower 180 is a hexagonal structure formed by panels 184 (e.g., six panels 184) with nine LED arrays 182 mounted on each panel 184. In certain embodiments, the tower may include more or fewer panels 184 (e.g., three panels 184, four panels 184, eight panels 184, etc.) and/or each panel 184 may include more or fewer LED arrays 182 (e.g., one LED array 182, two LED arrays 182, five LED arrays 182, twenty LED arrays 182, etc.). In some embodiments, the tower 180 may be shaped differently in other embodiments and/or may be omitted. For example, the LED arrays 182 may be mounted directly to the enclosure 88 in some embodiments. In certain embodiments, the LED assembly 82 may include other LED configurations in addition to or in place of the LED arrays 182.

The LED arrays 182 of the LED assembly 82 are configured to emit light outwardly through the fluid flowing between the LED assembly 82 and the enclosure 88 (e.g., through the outer annular passage 172 formed between the LED assembly 82 and the enclosure 88) and through the enclosure 88. The fluid may be transparent or semi-transparent such that the fluid is configured to allow the light to pass through the fluid toward the enclosure 88. For example, the fluid may be a dielectric and/or electrically insulating fluid having a refractive index of between 1.4 and 1.6. In some embodiments, the enclosure 88 enclosing the fluid may be acrylic, polycarbonate, glass (e.g., borosilicate glass), or another material having a refractive index between about 1.44-1.5. In certain embodiments, the LEDs of the LED arrays 182 may include silicone (e.g., a silicone layer) through which light emitted by the LEDs passes. The silicone may have a refractive index of about 1.38-1.6. As such, a type of fluid (e.g., the fluids having the refractive indices within the ranges recited above) may facilitate light passage from the LEDs, through the fluid, and toward the enclosure 88. Additionally, the refractive index of the layer of the LED (e.g., the silicone), the fluid, and/or the enclosure 88 may generally be matched (e.g., within a difference threshold). In some embodiments, the fluid and/or the enclosure 88 may behave as lens configured to optically shape light provided by the LED assembly 82. For example, the fluid and/or the enclosure 88 having the specific refractive indices described above may allow the fluid and/or the enclosure to shape the light to enhance illumination of the LED assembly 82.

Additionally or alternatively, the fluid may include a mineral oil having a relatively long shelf life (e.g., about twenty-five years) or a fluid having properties similar to mineral oil. The fluids may be non-corrosive such that the fluids facilitate pumping along the cooling circuit 110 by the pump 108 and compatible with plastics and other system materials. Further, such fluids may generally have a relatively low viscosity, which may allow directly cooling the electronics of the LED assembly 82 (e.g., the LED arrays 182, wiring coupled to the LED arrays 182 and to printed circuit boards ("PCB's"), and other electronic components of the LED assembly 82) without affecting the performance/functionality of the electronics. In certain embodiments, the type of the fluid included in the cooling circuit 110 may depend on an amount of LED arrays 182 and/or an amount of LEDs generally included in the LED assembly 82, a structure/geometry of the LED assembly 82, a density of LEDs of the LED assembly 82, an amount of heat generated by the LED assembly 82, or a combination thereof. During operation, the LED arrays 182 of the LED assembly 82 may have a power density of between 20 W-300 W per square inch, between 50 W-250 W per square inch, and other suitable power densities. In an aspect, each LED array 182 may have a surface area of 4 square inches or less. Due to the cooling systems mentioned herein, the LED arrays 182 may be operated at the aforementioned power densities for longer than 30 seconds, 1 minute, 1 hour, and 80 hours. In some embodiments, the LED assembly 82 may have a total power of 400 W-5000 W.

In some embodiments, the refractive index of the fluid disposed between the LED arrays 182 and the enclosure 88 may cause light to more easily leave the LED arrays 182 compared to an embodiment in which the LED arrays 182 are exposed to air. This may result in a color shift of the light emitted from the LED arrays 182. The controller 120 may control the LED arrays 182 (e.g., the colors and/or color temperatures of the LED arrays 182) based on the potential color shift of the emitted light.

The enclosure 88 may include clear, transparent, and/or semi-transparent materials such that the light emitted by the LED assembly 82 may pass through the enclosure 88 (e.g., after passing through the fluid disposed within and/or flowing through the outer annular passage 172) and outwardly from the enclosure 88. For example, the enclosure 88 may be formed of a clear plastic and/or glass (e.g., borosilicate glass). In certain embodiments, the enclosure 88 may include poly(methyl methacrylate) ("PMMA") and/or other acrylics.

As illustrated, the LED assembly 82 includes printed circuit boards ("PCBs") 190 coupled to a base PCB 192, the LED arrays 182, and the end 164 (e.g., end plate) of the LED assembly 82. For example, each PCB 190 extends generally along a respective panel 184 and is coupled (e.g., physically and electrically coupled via connectors 193) to the LED arrays 182 coupled to the respective panel 184. Each connector 193 is coupled to a respective LED array 182 at connections 194. In certain embodiments, each LED array 182 may be configured to snap/click into place on the panel 184. For example, each panel 184 may include features configured to receive the LED arrays 182 via a snap or click mechanism to facilitate assembly of the LED assembly 82.

Figure 6A:
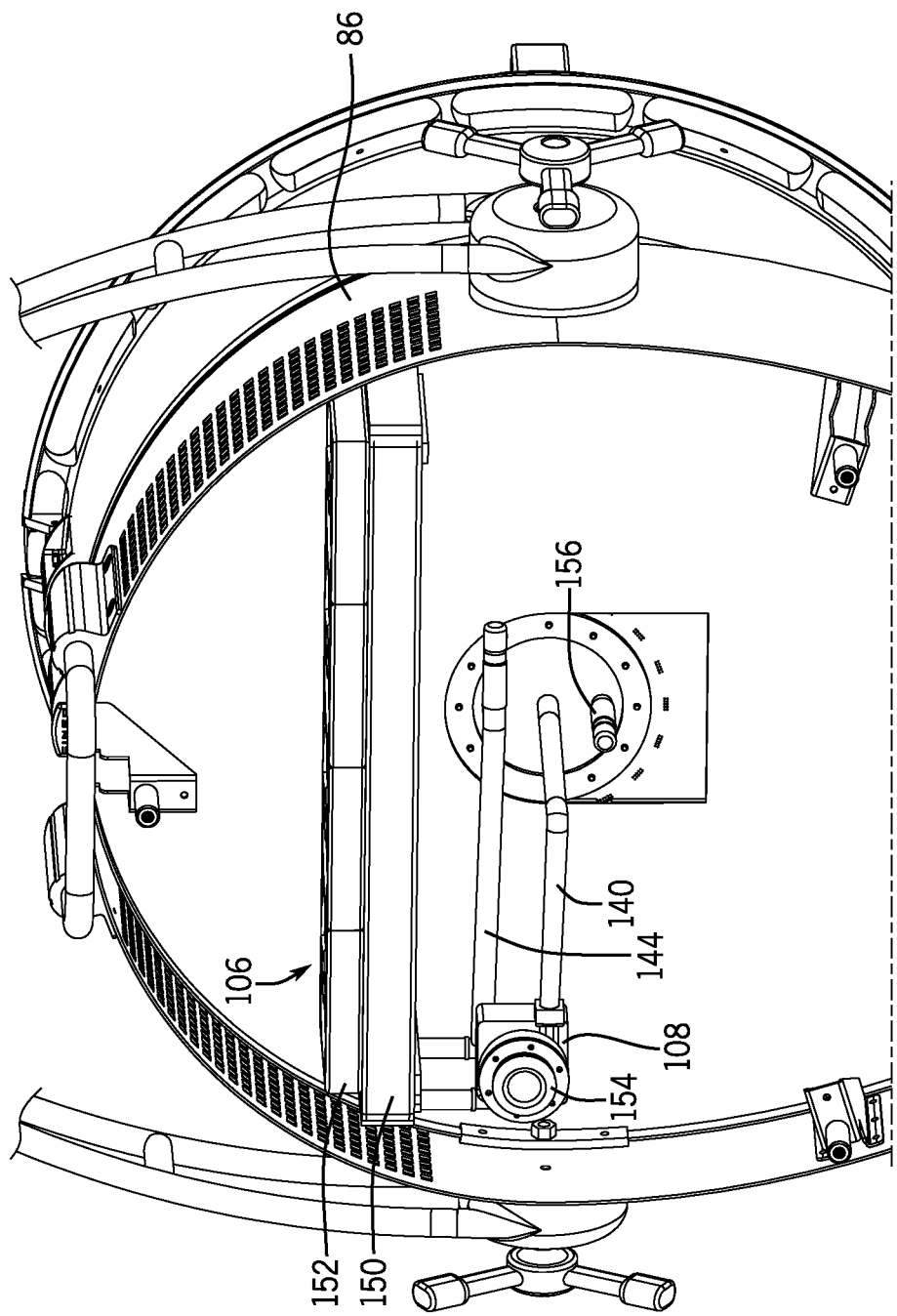
FIG. 6A is a rear perspective view of the lighting assembly of FIG. 1 having the cooling system and the LED assembly, in accordance with one or more current embodiments.

FIG. 6A is a rear perspective view of the lighting assembly 70 of FIG. 2 having the cooling system 80, in accordance with one or more current embodiments. As generally described above, the cooling system 80 includes the inlet pipe 140 configured to flow fluid (e.g., chilled fluid) into the LED assembly 82 and the enclosure 88 and the outlet pipe 144 configured to receive fluid (e.g., heated fluid) from the LED assembly 82 and the enclosure 88. The fluid circulates from the outlet pipe 144, through the radiator 150 of the heat exchanger 106, through the pump 108, and back to the inlet pipe 140. As illustrated, the cooling system includes four fans 152 configured to draw air across the radiator 150 to cool the fluid passing through the radiator 150. In certain embodiments, the cooling system may include more or fewer fans 152 (e.g., one fan 152, two fans 152, three fans 152, five fans 152, ten fans 152, etc.). The fans 152 are positioned above the radiator 150, such that the heat transferred from the fluid passing through the radiator 150 moves generally upwardly toward/through the fans 152. Additionally, the heat exchanger 106 and the pump 108 are mounted to the chassis 86 of the lighting assembly 70.

Figure 6B:
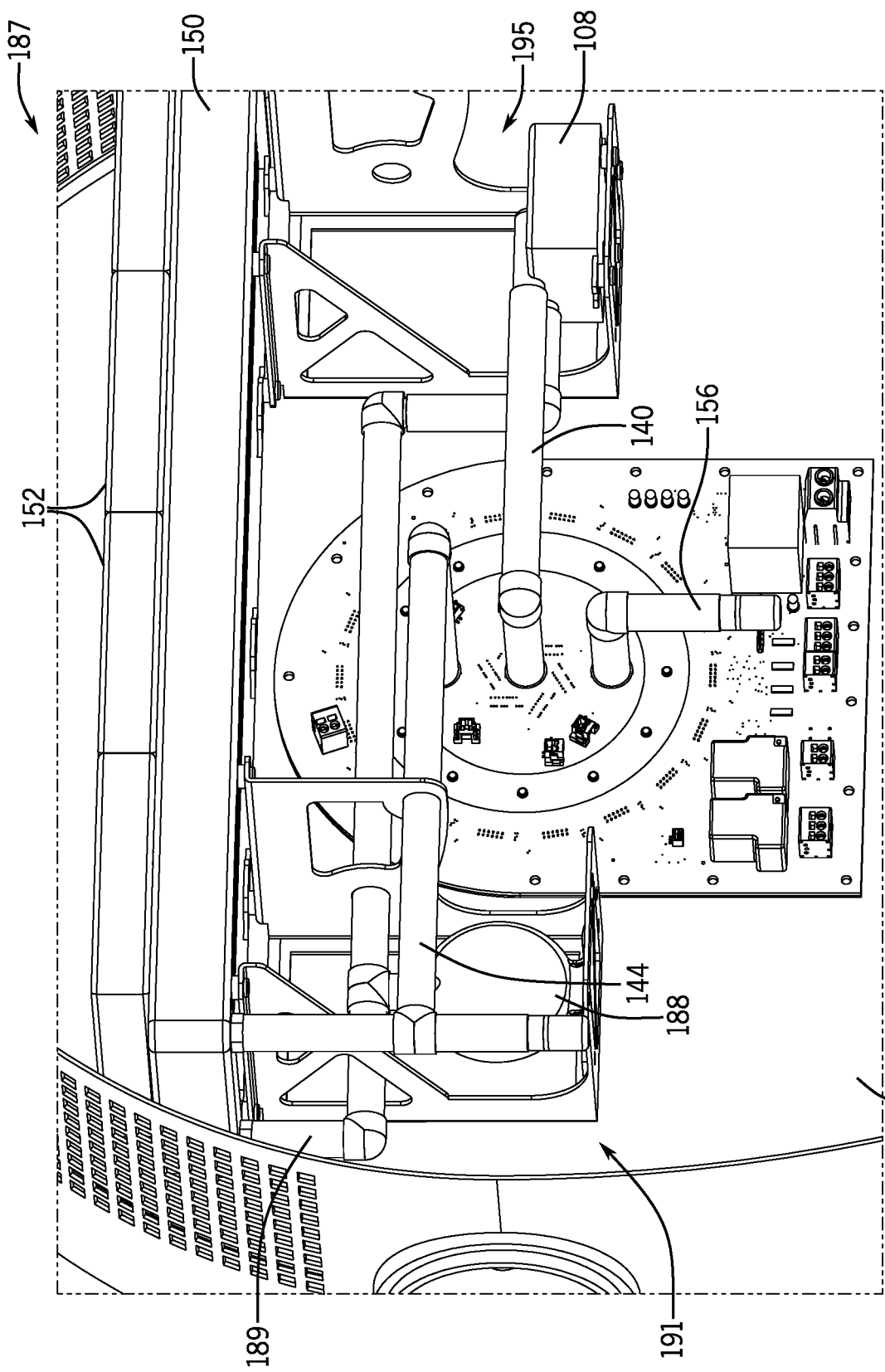
FIG. 6B is a rear perspective view of another embodiment of a lighting assembly having the cooling system of FIG. 1, in accordance with one or more current embodiments.

FIG. 6B is a rear perspective view of an embodiment of a lighting assembly 187 having the cooling system 80 of FIG. 1, in accordance with one or more current embodiments. The lighting assembly 187 includes the inlet pipe 140 configured to flow fluid (e.g., chilled fluid) into the LED assembly 82 and the enclosure 88 and the outlet pipe 144 configured to receive fluid (e.g., heated fluid) from the LED assembly 82 and the enclosure 88. The fluid circulates from the outlet pipe 144 to the radiator 150, through the radiator 150, to an intermediate pipe 189, through an expansion chamber 188 coupled to the intermediate pipe 189, and back to the inlet pipe 140 via the pump 108. The expansion chamber 188 is configured to expand due to heating of the fluid and to contract due to cooling of the fluid (e.g., to accommodate volumetric changes of the fluid along the cooling circuit 110). In certain embodiments, the expansion chamber 188 may be included elsewhere along the cooling circuit 110, such as along the inlet pipe 140 and/or along the outlet pipe 144.

As illustrated, the lighting assembly 187 includes a first bracket 191 coupled to the radiator 150 and the expansion chamber 188 and a second bracket 195 coupled to the radiator 150 and the pump 108. The radiator 150 and the expansion chamber 188 are mounted to the first bracket 191, and the first bracket 191 is mounted to the chassis 86, such that the first bracket 191 is configured to support a weight of the expansion chamber 188 and/or at least a portion of a weight of the radiator 150 (e.g., to transfer forces associated with the weight(s) to the chassis 86). Additionally, the radiator 150 and the pump 108 are mounted to the second bracket 195, and the second bracket 195 is mounted to the chassis 86, such that the second bracket 195 is configured to support a weight of the pump 108 and/or at least a portion of the weight of the radiator 150 (e.g., to transfer forces associated with the weight(s) to the chassis 86).

FIG. 7 is a perspective view of an LED assembly 196 and an enclosure 198 that may be included the cooling system 80 of FIG. 1, in accordance with one or more current embodiments. As illustrated, the LED assembly 196 is disposed within the enclosure 198. The LED assembly 196 includes a fluid inlet 200 configured to receive the fluid flowing along the cooling circuit 110 (e.g., as indicated by arrow 202) and a fluid outlet 204 configured to flow the fluid from the enclosure and the LED assembly 196 to the cooling circuit 110 (e.g., as indicated by arrow 206) (although the fluid direction may be reversed such that the fluid enters through the fluid outlet 204, for example, and exits through the fluid inlet 200). Additionally, the enclosure 198 includes a base 208 and a cylinder 210 extending from the base 208. In certain embodiments, the LED assembly 196 and/or the enclosure 198 of the cooling system 80 may be included in the lighting assembly of FIGS. 2-6.

The LED assembly 196 includes a tower 220 and the LED arrays 182 mounted to the tower 220. As illustrated, the tower 220 is a hexagonal structure with nine LED arrays 182 mounted on each of the six sides of the hexagonal structure. In certain embodiments, the tower 220 may include more or fewer sides (e.g., three sides, four sides, eight sides, etc.) and/or each side may include more or fewer LED arrays 182 (e.g., one LED array 182, two LED arrays 182, five LED arrays 182, twenty LED arrays 182, etc.). In some embodiments, the tower 220 may be shaped differently in other embodiments and/or may be omitted. For example, the LED arrays 182 may be mounted directly to the enclosure 198 in some embodiments. In certain embodiments, the LED assembly 196 may include other LED configurations in addition to or in place of the LED arrays 182.

The LED arrays 182 of the LED assembly 196 are configured to emit light outwardly through the fluid flowing between the LED assembly 196 and the enclosure 198 (e.g., through an outer annular passage 224 of the cooling system 80) and through the enclosure 198. In some embodiments, the enclosure 198 enclosing the fluid may be acrylic, polycarbonate, glass (e.g., borosilicate glass), or another material having a refractive index between about 1.44-1.5. Additionally, the refractive index of the layer of the LED (e.g., the silicone), the fluid, and/or the enclosure 198 may generally be matched (e.g., within a difference threshold).

The enclosure 198 may include clear, transparent, and/or semi-transparent materials such that the light emitted by the LED assembly 196 may pass through the enclosure 198 (e.g., after passing through the fluid disposed within and/or flowing through the outer annular passage 224) and outwardly from the enclosure 198. For example, the enclosure 198 may be formed of a clear plastic and/or glass (e.g., borosilicate glass). In certain embodiments, the enclosure 198 may include poly(methyl methacrylate) ("PMMA") and/or other acrylics.

The cooling system 80 is configured to flow the fluid into the fluid inlet 200, through the outer annular passage 224 between the LED assembly 196 and the enclosure 198, and toward an end 230 of the tower 220. The end 230 is disposed generally opposite of the base 208. The tower 220 includes an inner annular passage 232 extending from the end 230 to the base 208. As illustrated, the inner annular passage 232 is fluidly coupled to the outer annular passage 224 at the end 230 of the tower 220. The cooling system 80 is configured to flow the fluid from the outer annular passage 224 and into the inner annular passage 232 via the end 230. The inner annular passage 232 is fluidly coupled to the fluid outlet 204 such that the fluid may pass through the tower 220, via the inner annular passage 232, and out of the tower 220 and the enclosure 198 at the fluid outlet 204.

As the fluid passes over and through the LED assembly 196 (e.g., over the LED arrays 182 and through the tower 220), the fluid is configured to absorb heat generated by operation of the LED arrays 182. For example, because the fluid is configured to absorb heat generated by the LED arrays 182 while flowing through both the outer annular passage 224 and the inner annular passage 232, the cooling system 80 is configured to significantly increase an amount of heat that may be absorbed compared to embodiments of cooling systems that extract heat from an interior or exterior of a light source. Additionally, because the fluid is generally transparent and/or semi-transparent (e.g., the fluid has a refractive index generally between 1.4-1.5), the fluid may have minimal/no effects on the light emitted from the LED assembly 196 and through the fluid. As such, the fluid may actively cool the LED assembly 196 during operation of the LED assembly 196 with little to no effect on a quality of light emitted from the LED assembly 196.

The LED assembly 196 is a side emission configuration of a lighting assembly, such that the LED assembly 196 is configured to emit light radially outwardly (e.g., from sides of the LED assembly 196) and through the fluid and the enclosure 198. As described in greater detail below in reference to FIGS. 14 and 15, the cooling system 80 may also include a front emission configuration of the lighting assembly, such as in place of or in addition to the side emission configuration of FIGS. 7-10.

Figure 8:
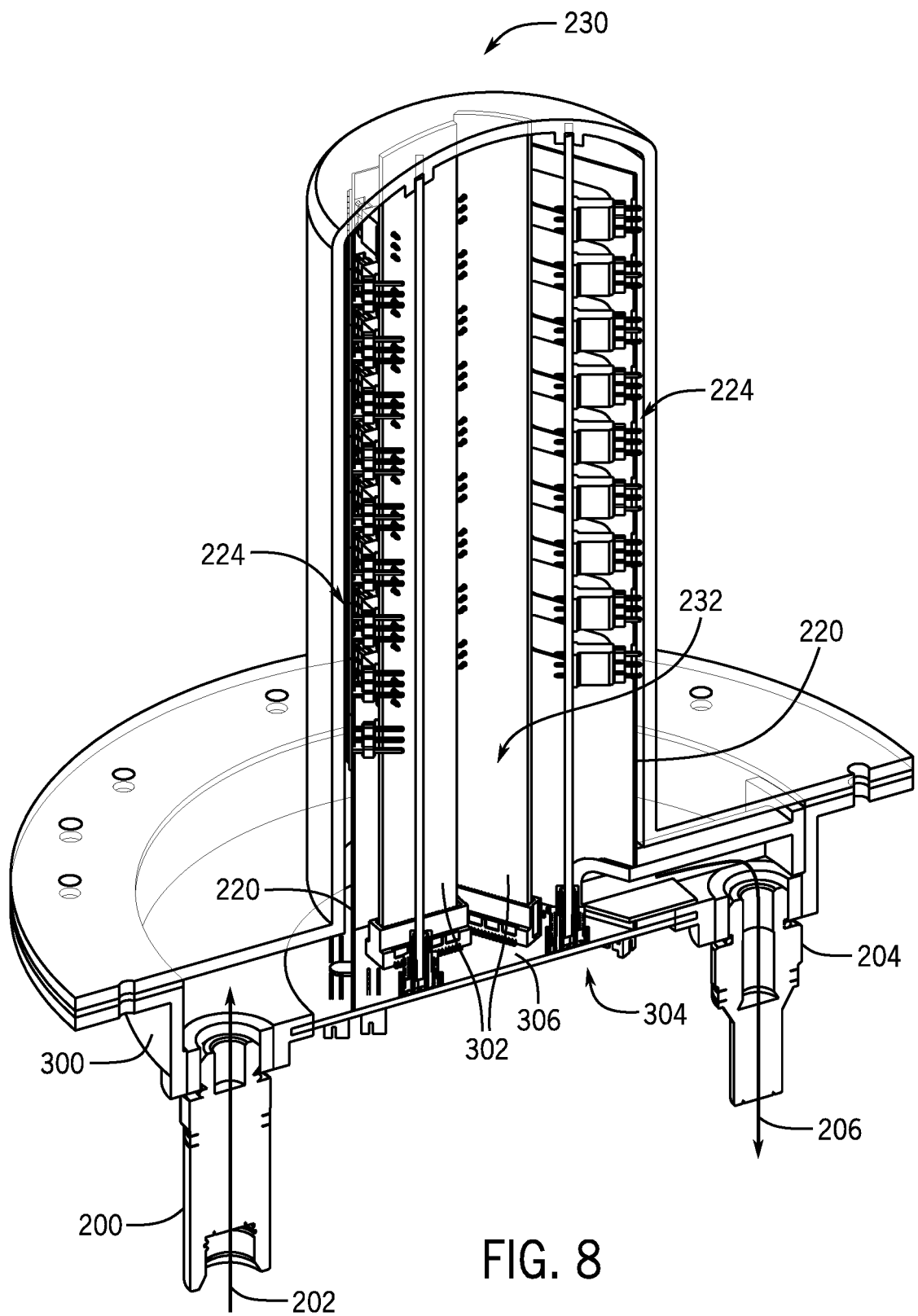
FIG. 8 is a perspective cross-sectional view of the LED assembly and the transparent enclosure of FIG. 7, in accordance with one or more current embodiments.

FIG. 8 is a perspective cross-sectional view of the LED assembly 196 and the enclosure 198 of FIG. 7, in accordance with one or more current embodiments. As described above, the enclosure 198 is configured to receive the fluid from the pump 108 through the fluid inlet 200. The fluid is then configured to contact the tower 220 and a base 300 of the LED assembly 196 coupled to the tower 220. The tower 220 and the base 300 are configured to direct the fluid upwardly along the outer annular passage 224. The fluid is then configured to flow through the end 230 and into the inner annular passage 232. As illustrated, the inner annular passage 232 is formed between and by the tower 220 and PCBs 302 of the LED assembly 196. The fluid is configured to flow downwardly within the inner annular passage 232 toward a base PCB 304 electrically coupled to the PCBs 302. After passing over the PCBs 302 and/or the base PCB 304, the fluid is configured to exit the tower 220 and the enclosure 198 at the fluid outlet 204. As mentioned with respect to FIG. 7, the fluid direction may be reversed such that the fluid may be configured to flow in through the fluid outlet 204, up through the inner annular passage 232, through the end 230, and down the outer annular passage 224, and out the fluid inlet 200.

The PCBs 302 may be electrically coupled to the LED arrays 182 such that the PCBs 302 may provide power and/or communication with the LED arrays 182. For example, the LED assembly 196 may include wiring extending outwardly between the PCBs 302 and the LED arrays 182. As such, the fluid may flow over the PCBs 302 and the wiring extending between the PCBs 302 and the LED arrays 182 to cool and absorb heat from the tower 220 (e.g., heat generated by the LED arrays 182 that is transferred to/absorbed by the tower 220), from the PCBs 302, and/or from the wiring. Additionally, the fluid may flow over the base PCB 304 and may absorb heat from the base PCB 304. For example, the base PCB 304 includes a wet side 306 configured to contact the fluid and a dry side generally opposite the wet side 306 that is configured to remain dry (e.g., to not contact the fluid). As generally described above, the fluid may be dielectric and/or electrically insulating such that the fluid may have minimal/no electrical effects on the LED arrays 182, the PCBs 302, the base PCB 304, and the wiring of the LED assembly 196.

Figure 9:
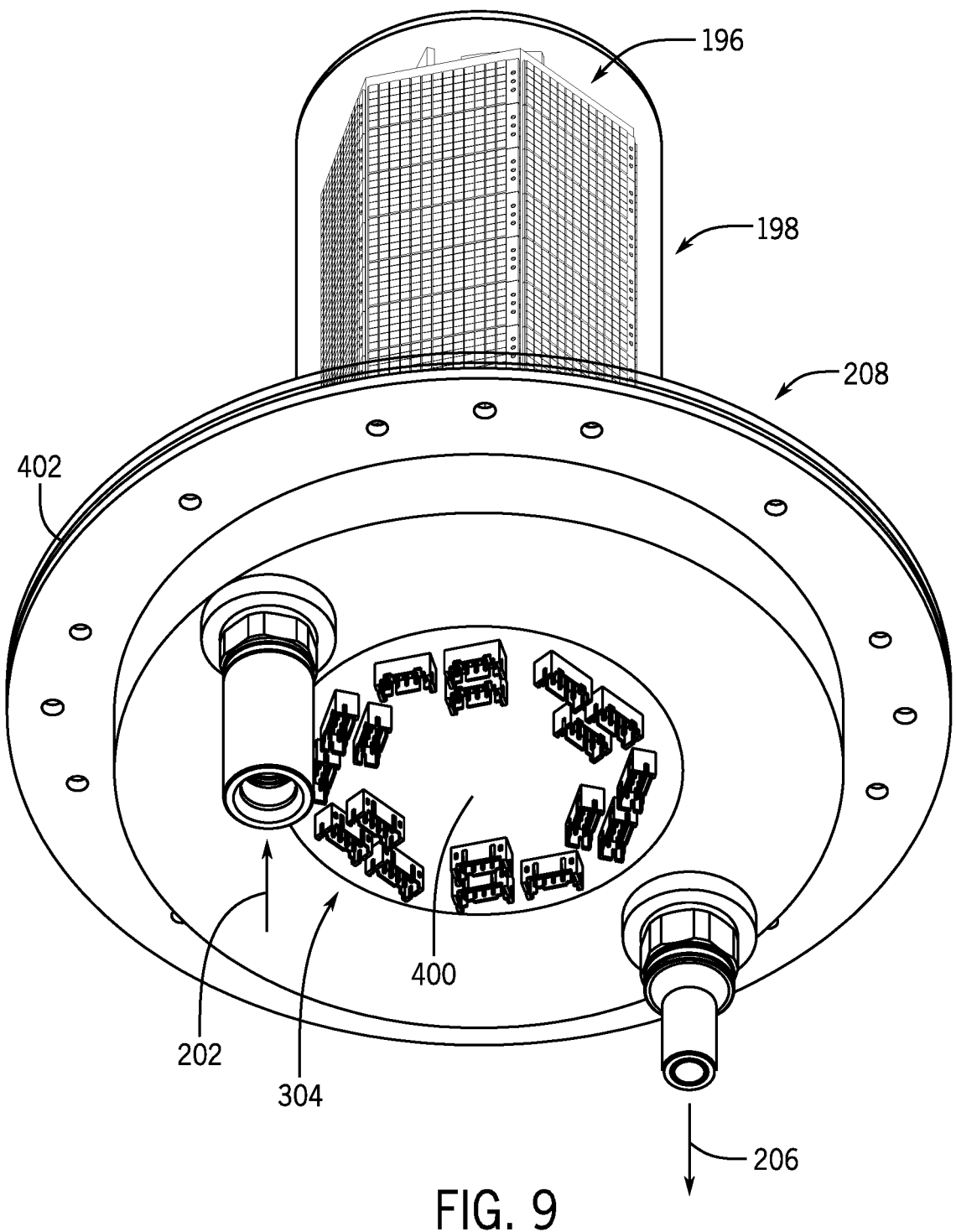
FIG. 9 is a bottom perspective view of the LED assembly and the transparent enclosure of FIG. 7, in accordance with one or more current embodiments.

FIG. 9 is a bottom perspective view of the LED assembly 196 and the enclosure 198 of FIG. 7, in accordance with one or more current embodiments. As illustrated, the base PCB 304 includes a dry side 400 configured to remain generally dry (e.g., to not contact the fluid during operation of the cooling system 80). The LED assembly 196 includes a gasket 402 configured to form a seal between the enclosure 198 and the LED assembly 196 (e.g., between the base 208 of the enclosure 198 and the base PCB 304 of the LED assembly 196). As such, the LED assembly 196 may be remain dry at the dry side 400 of the base PCB 304, and the cooling system 80 may be configured to flow the fluid through the enclosure 198 and the tower 220 without leaking fluid.

Figure 10:
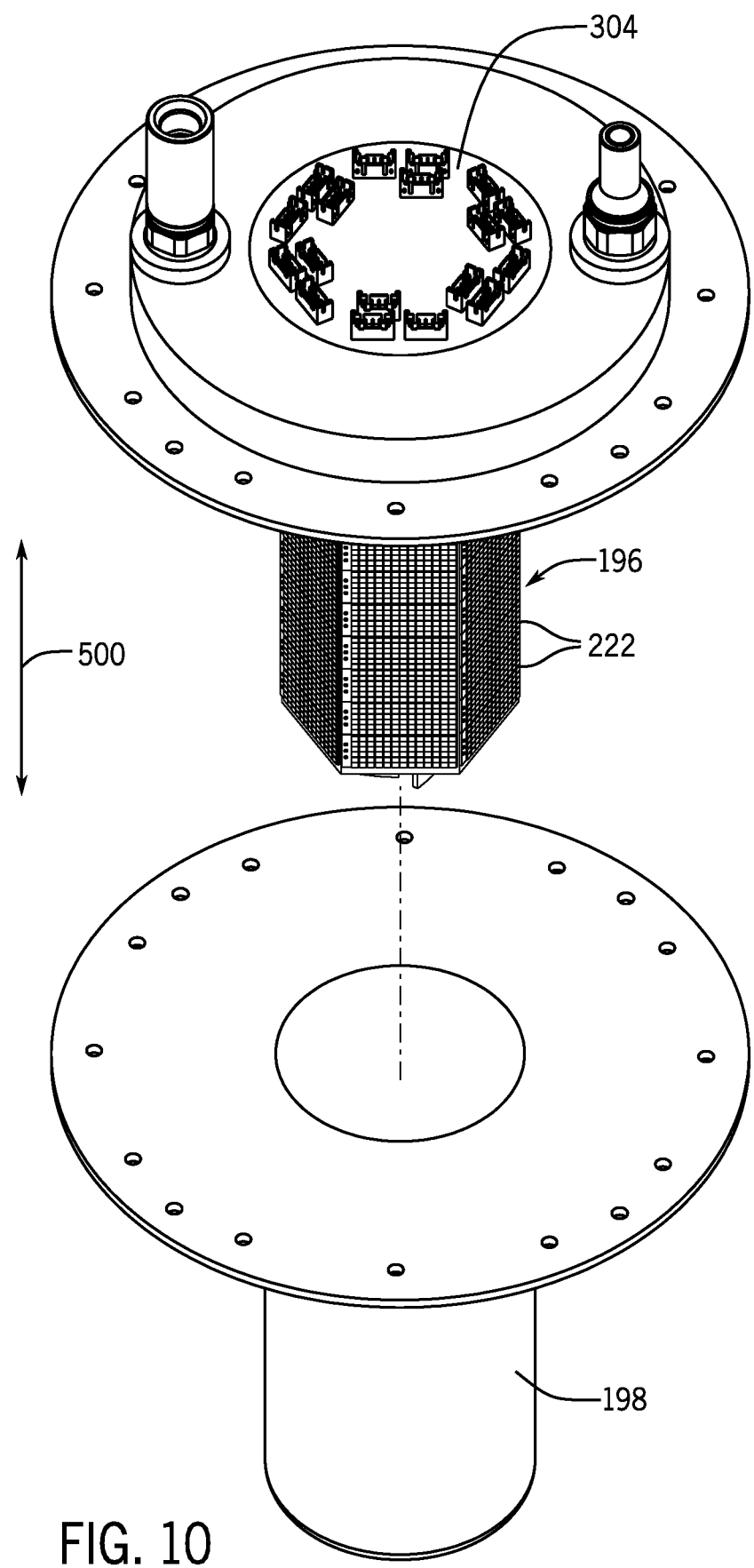
FIG. 10 is a partially exploded view of the LED assembly and the transparent enclosure of FIG. 7, in accordance with one or more current embodiments.

FIG. 10 is a partially exploded view of the LED assembly 196 and the enclosure 198 of FIG. 7, in accordance with one or more current embodiments. The LED assembly 196 is configured to insert into and to be removed from the enclosure 198 as generally indicated by arrow 500. For example, to replace portions of the LED assembly 196 (e.g., the LED arrays 182, the PCBs 302, the base PCB 304, wiring, etc.), the LED assembly 196 and the enclosure 198 may be disassembled by removing the LED assembly 196 from the enclosure 198 along an axis generally parallel to arrow 500. Additionally, while the LED assembly 196 and the enclosure 198 are disposed in the illustrated positions (e.g., with the LED assembly 196 and the enclosure 198 extending downwardly), the LED assembly 196 may be removed from the enclosure 198 with a minimal loss and/or splashing of the fluid using threaded enclosures, a gasket, a latch, and/or other securing mechanisms. To assemble/reassemble the LED assembly 196 into the enclosure 198, the LED assembly 196 may be inserted into the enclosure 198 along the axis generally parallel to the arrow 500. Thus, the configuration and coupling of the LED assembly 196 and the enclosure 198 described herein may facilitate quick and easy maintenance of the LED assembly 196.

Figure 11:
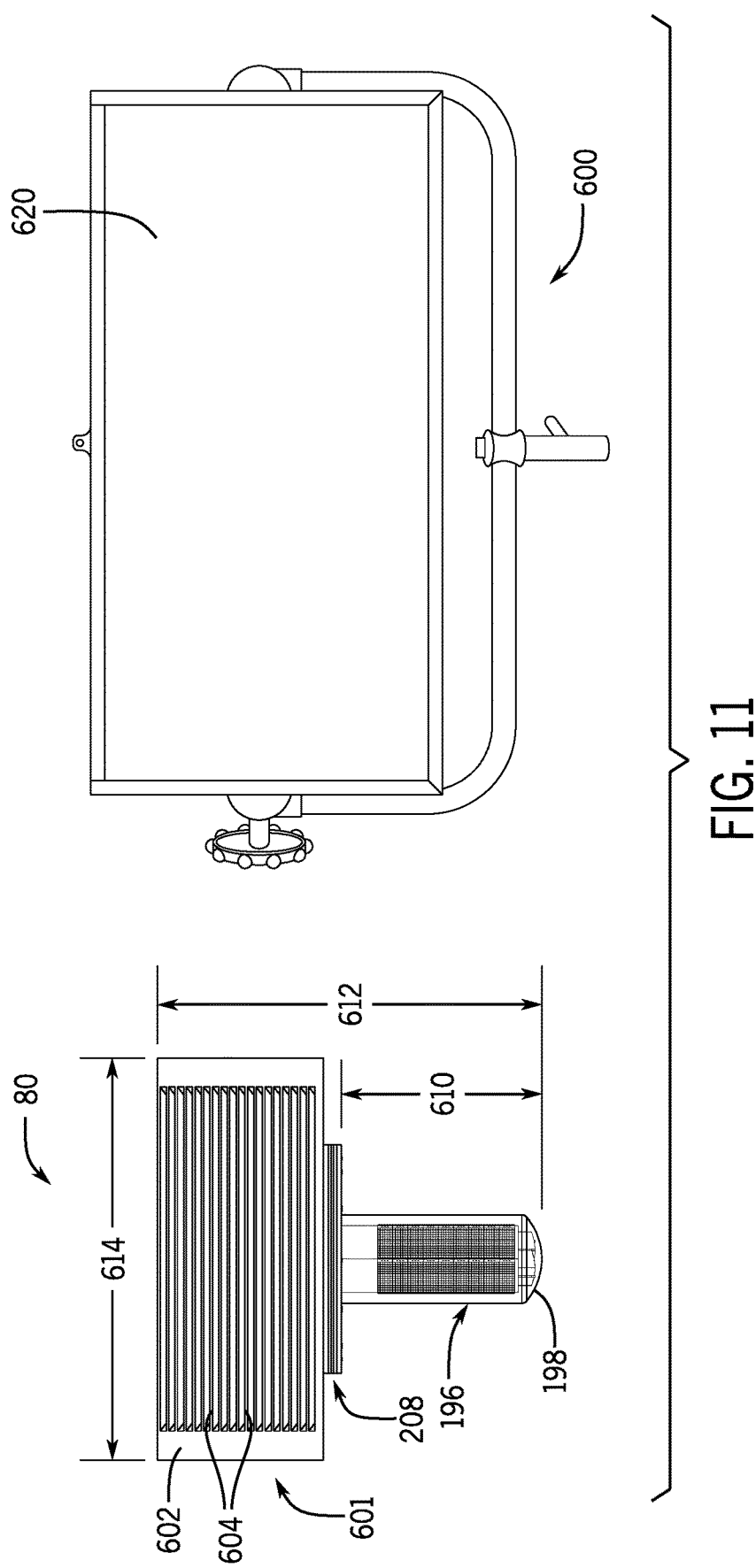
FIG. 11 is a side view of the cooling system of FIG. 7 and a side view of an embodiment of a lighting assembly, in accordance with one or more current embodiments.

FIG. 11 is a side view of the cooling system 80 of FIG. 7 and a side view of a lighting assembly 600, in accordance with one or more current embodiments. As illustrated, the base 208 of the enclosure 198 is coupled to a heat exchanger 601. After absorbing heat from and at the LED assembly 196, the fluid is configured to flow into and through the heat exchanger 601. The heat exchanger 601 includes a radiator 602 configured to exchange heat from the fluid to ambient air adjacent to the heat exchanger 601. The heat exchanger 601 may include the radiator 602 on each of four sides of the heat exchanger 601 (e.g., four radiators 602). In certain embodiments, the heat exchanger 601 may include more of fewer sides with each side having the radiator 602. The radiator 602 includes fins 604 configured to transfer heat from the fluid (e.g., to absorb heat from the fluid) to the ambient air. In some embodiments, the heat exchanger 601 may include other shapes configured to cool the fluid (e.g., a sphere, a cylinder, etc.).

The LED arrays 182 of the LED assembly 196 extend outwardly from the base 208 of the enclosure 198 a distance 610. In certain embodiments, the distance 610 may be between about three inches and about nine inches. In some embodiments, the distance 610 may be about five and one-half inches. Additionally, the cooling system 80 extends a generally vertical distance 612 and a generally horizontal distance 614. In certain embodiments, the generally vertical distance 612 may between about ten inches and about twenty inches, and/or the generally horizontal distance 614 may be between about seven inches and about seventeen inches. In some embodiments, the generally vertical distance 612 may be fourteen inches, and/or the generally horizontal distance 614 may be twelve inches.

The lighting assembly 600 is a prior art lighting assembly having a lighting area 620 configured to emit light. A back portion of the lighting area 620 may be a heat sink configured to absorb/transfer heat from the lighting area 620. As illustrated, the cooling system 80 is generally smaller and more compact than the lighting area 620 and the heat sink of the lighting assembly 600. Additionally, as generally described above, the cooling system 80 is configured to provide sufficient cooling for the LED assembly 196 as the LED assembly 196 operates at 1500 W. The lighting assembly 600 may be configured to provide cooling for lights of the lighting area 620 operating at 400 W. As such, the cooling system 80 may be more versatile than the lighting assembly 600, and prior art lighting assemblies generally, by providing a more compact design configured to operate at significantly higher powers. In certain embodiments, the LED assembly 82 and/or the enclosure 88 of the cooling system 80 may be coupled to the heat exchanger 601, such that the heat exchanger 601 is configured to exchange heat with the fluid circulating through the LED assembly 82 and the enclosure 88.

FIG. 12 includes side views of the cooling system 80 of FIG. 7, in accordance with one or more current embodiments. The cooling system 80 includes a cover 700 configured to fit over/onto the enclosure 198. The cover 700 includes materials configured to convert a color correlated temperature ("CCT") of light emitted by the LED assembly 196. For example, the cover 700 may include and/or be formed of phosphor and may be configured to convert a cool white CCT of about 5600K to a warmer white CCT of about 4300K, about 3200K, and other CCT's. In certain embodiments, the cover 700 may be injection molded plastic, silicone, coated glass, or a combination thereof. In certain embodiments, the cover 700 may fit over/onto the enclosure 88, such that the cover 700 converts a CCT of light emitted by the LED assembly 82 through the enclosure 88.

The cover 700 is configured to slide onto and off of the enclosure 198, as generally noted by arrow 702. For example, the cover 700 may be easily field changeable such that an operator may slide the cover 700 onto and off of the enclosure 198. Additionally, light produced by a low-cost, single-color version of the LED assembly 196 may easily be converted to any CCT with the addition of the cover 700, which may be of relatively low cost. Further, the cover 700 may be significantly more power efficient compared to traditional embodiments, because the cover 700 is not a filter removing a portion of light emitted by the LED assembly 196. Instead, the cover 700 is configured to convert light to a desired color and CCT.

In certain embodiments, the LED assembly 196 may be configured to emit a blue light, cool white light (e.g., 5000K or higher), or other colors. The cover 700 may adapted for any suitable color and/or white such that light emitted from a single-color version of the LED assembly 196 (e.g., a blue light LED assembly 196 or a cool white light LED assembly 196) may be converted into any CCT and/or any color with no change to the LED assembly 196 or other electronics of the cooling system 80.

As illustrated, the cover 700 is configured to contact the enclosure 198 while the cover 700 is disposed on the enclosure 198. The contact between enclosure 198 and the cover 700 may allow the enclosure 198 to transfer heat to the cover 700. The fluid flowing within the enclosure 198 may be configured to cool both enclosure 198 and the cover 700 (e.g., the fluid may absorb heat from the enclosure 198 to facilitate cooling of the cover 700).

FIG. 13 includes perspective views of the cooling system 80 of FIG. 7 coupled to light directing assemblies 800, 802, and 804 configured to direct light emitted by the LED assembly 82 of the cooling system 80, in accordance with one or more current embodiments. For example, the light directing assembly 800 is a high bay assembly configured to be disposed in building setting and to direct light emitted by the LED assembly 82 downwardly. The light directly assembly 802 is a space light directing assembly configured to be disposed in a studio to provide environment lighting. Additionally, the light directly assembly 804 is an umbrella assembly configured to be disposed in a studio and to generally focus light emitted by the LED assembly 82.

FIG. 14 is a perspective cross-sectional view of another embodiment of a lighting assembly 820 having an LED assembly 822 and the cooling system 80 of FIG. 1, in accordance with one or more current embodiments. The lighting assembly 820 is a front emission configuration of a lighting assembly that may be included in the cooling system 80, such that the lighting assembly 820 is configured to emit light outwardly through a front portion of the lighting assembly 820, as indicated by arrow 823, rather than through side of a lighting assembly (e.g., as in lighting assembly embodiments of FIGS. 2-13). Accordingly, the cooling system 80 may include a lighting assembly having a side emission configuration, a front emission configuration, and/or others.

The lighting assembly 820 includes a chassis 824 configured to receive and flow the fluid to cool the LED assembly 822. As illustrated, the LED assembly 822 is disposed within and mounted to the chassis 824. Additionally, the lighting assembly 820 includes a cover 826 coupled to the chassis 824. The cover 826 is configured to at least partially enclose the lighting assembly 820, such that the cover 826 directs the fluid through the lighting assembly 820 and over the LED assembly 822. Additionally, the cover 826 may include clear, transparent, and/or semi-transparent materials such that the light emitted by the LED assembly 822 may pass through the cover 826 (e.g., after passing through the fluid) and outwardly from the cover 826. For example, the cover 826 may be formed of a clear plastic and/or glass (e.g., borosilicate glass). In certain embodiments, the cover 826 may include poly(methyl methacrylate) ("PMMA") and/or other acrylics and/or other materials described herein.

The chassis 824 includes a fluid inlet 830 configured to receive the fluid flowing along the cooling circuit 110 (e.g., as indicated by arrow 832) and a fluid outlet 834 configured to flow the fluid from the chassis 824 to the cooling circuit 110 (e.g., as indicated by arrow 836) (although the fluid direction may be reversed such that the fluid enters through the fluid outlet 834, for example, and exits through the fluid inlet 830). Additionally, the chassis 824 includes a base 840 and a cylinder 842 extending from the base 840. The base 840 includes the fluid inlet 830 and the fluid outlet 834. In certain embodiments, the LED assembly 822 and/or the chassis 824 may be included in the lighting assembly and/or LED assembly of FIGS. 2-13.

The LED assembly 822 includes LEDs 850 mounted to a PCB 852. The PCB 852 is mounted to the chassis 824 via connections 854. For example, the PCB 852 includes a tab 856 extending over a ledge 858 of the chassis 824. The connections 854 secure the LED assembly 822 to the ledge 858. Additionally, the connections 854 may be electrical connections configured to provide power and/or electrical connections to the LEDs 850. In certain embodiments, the PCB 852 may include an additional tab 856 disposed generally opposite the illustrated tab 856 and configured to mount to an additional ledge 858 of the chassis 824. However, the additional tab 856 and the additional ledge 858 are omitted in FIG. 14 for purposes of clarity.

The LEDs 850 of the LED assembly 822 are configured to emit light outwardly through the fluid flowing between the LED assembly 822 and the cover 826 (e.g., through an upper passage 860 of the cooling system 80) and through the cover 826. In some embodiments, the cover 826 enclosing the fluid may be acrylic, polycarbonate, glass (e.g., borosilicate glass), or another material having a refractive index between about 1.44-1.5. Additionally, the refractive index of the LEDs 850 (e.g., the silicone), the fluid, and/or the cover 826 may generally be matched (e.g., within a difference threshold).

The cooling system 80 is configured to flow the fluid into the fluid inlet 830, into the upper passage 860 extending between the LED assembly 822 and the cover 826 (e.g., as indicated by arrow 862), and into a lower passage 864 extending between the LED assembly 822 and the base 840 of the chassis 824 (e.g., as indicated by arrow 866). The fluid is configured to absorb heat generated by the LED assembly 822 (e.g., due to operation of the LEDs 850 and the PCB 852 and the light emitted by the LEDs 850) as the fluid flow through the upper passage 860 and the lower passage 864. Additionally, because the fluid is generally transparent and/or semi-transparent (e.g., the fluid has a refractive index generally between 1.4-1.5), the fluid may have minimal/no effects on the light emitted from the LED assembly 822 and through the fluid. As such, the fluid may actively cool the LED assembly 822 during operation of the LED assembly 822 with little to no effect on a quality of light emitted from the LED assembly 822.

The cooling system 80 is configured to flow the fluid from the upper passage 860 and into the fluid outlet 834, as indicated by arrow 870, and from the lower passage 864 into the fluid outlet 834, as indicated by arrow 872. After flowing the fluid over the LED assembly 822 and into the fluid outlet 834, the pump 108 circulates the fluid through a heat exchanger 106 of the cooling system 80, for example, to cool the fluid.

FIG. 15 is a perspective view of the lighting assembly 820 of FIG. 14, in accordance with one or more current embodiments. As described above, the cooling system 80 is configured to circulate the fluid into the fluid inlet 830 of the chassis 824, over the LED assembly 822 of the lighting assembly 820, and through the fluid outlet 834, thereby cooling the LED assembly 822. Accordingly, the lighting assembly 820 of FIGS. 14 and 15 provides a front emission configuration of a lighting assembly and LED assembly that may be cooled via the cooling system 80.

FIG. 16 is a flow diagram of a method 900 for controlling the cooling system 80 of FIG. 1, in accordance with one or more current embodiments. For example, the method 900, or portions thereof, may be performed by the controller 120 of the cooling system 80. The method 900 begins at block 902, where the temperature at an LED assembly (e.g., the LED assembly 82/196) is measured. The sensor 121 may measure the temperature and output a signal (e.g., an input signal to the controller 120) indicative of the temperature at or adjacent to the LED assembly (e.g., a temperature at a surface of the LED assembly, a temperature of the fluid adjacent to and/or flowing over the LED assembly, a temperature at a surface of the enclosure 88/198, etc.). The controller 120 may receive the signal indicative of the temperature.

At block 904, the temperature at the LED assembly is determined. Block 904 may be performed in addition to or in place of block 902. For example, block 902 may be omitted from the method 900, and the sensor 121 may be omitted from the cooling system 80. The controller 120 may be configured to determine the temperature at the LED assembly based on whether the LED assembly, or portions thereof, are emitting light and based on an amount of time that the LED assembly, or the portions thereof, have been emitting light. As generally described above, the controller 120 may be configured to control the LED assembly (e.g., by controlling which LED arrays 182 are emitting light, a duration that the LED arrays 182 emit light, an intensity of the light emitted by the LED arrays 182, etc.). Based on the control actions, the controller 120 may determine/estimate the temperature at the LED assembly (e.g., the temperature at the surface of the LED assembly 82/196, the temperature of the fluid adjacent to and/or flowing over the LED assembly 82/196, the temperature at the surface of the enclosure 88/198, etc.).

At block 906, operating parameter(s) of the cooling system 80 are adjusted based on the temperature at the LED assembly (e.g., the temperature measured at block 902 and/or determined at block 904). For example, the controller 120 may output a signal (e.g., an output signal) to the pump 108 indicative of instructions to adjust the flowrate of fluid through the cooling circuit 110. Additionally or alternatively, the controller 120 may output a signal to a heat exchanger (e.g., the heat exchanger 106/601) indicative of instructions to adjust a flow rate of air flowing over a radiator of the heat exchanger (e.g., by outputting a signal to fans of the heat exchanger 106/601 indicative of instructions to adjust a rotational speed of the fans to adjust the flow rate of air). In certain embodiments, the controller 120 may control the LED assembly based on the temperature at the LED assembly, such as by reducing a number of LED arrays emitting light and/or to prevent overheating of the LED assembly.

In certain embodiments, the controller 120 may compare the temperature at the LED assembly to a target temperature and determine whether a difference between the temperature (e.g., a measured and/or determined temperature at the LED assembly 82/196) and the target temperature is greater than a threshold value. Based on the difference exceeding the threshold value, the controller 120 may control the operating parameters of the cooling system 80 described above. As such, the controller 120 may reduce certain control actions performed by the cooling system 80 based on minor temperature fluctuations and/or may reduce an amount of air flow and/or power used by the heat exchanger to cool the fluid. The controller 120 may receive an input indicative of the target temperature (e.g., from an operator of the cooling system 80) and/or may determine the target temperature based on a type of LED included in the LED assembly, a type of fluid circulating through the cooling system 80, a material of the enclosure, a material of the tower of the LED assembly, a size of the LED assembly and/or the cooling system 80 generally, or a combination thereof.

After completing block 906, the method 900 returns to block 902 and the next temperature at the LED assembly is measured. Alternatively, the method 900 may return to block 904, and the next temperature at the LED assembly may be determined. As such, blocks 902, 904, and 906 of the method 900 may be iteratively performed by the controller 120 and/or by the cooling system 80 generally to facilitate cooling of the LED assembly and the enclosure.

Debubbler System

FIG. 17 is a cross-sectional view of the debubbler system 112 of FIG. 1, in accordance with one or more current embodiments. As mentioned above, the debubbler system 112 may include a sealed hollow enclosure 950. The hollow enclosure 950 may include two molded enclosures 952. In certain embodiments, the hollow enclosure 950 may include two left molded polycarbonate (PC) enclosures. Furthermore, as illustrated, the debubbler system 112 may include a debubbler inlet 954 that receives fluid along the cooling circuit 110 to remove bubbles that build in the fluid as the fluid flows along the cooling circuit 110. The debubbler inlet 954 may include piping of any suitable size for coupling to the cooling circuit 110. For example, the debubbler inlet may include ⅜ inch cross-linked polyethylene (PEX) tubing or piping of any suitable material and size. The hollow enclosure 950 may include a first volume (e.g., in a cavity formed at the top of the hollow enclosure 950) having air and a second volume (e.g., in the bottom portion of the hollow enclosure 950) having the fluid. In certain embodiments, the hollow enclosure 950 may be expandable, such that the hollow enclosure 950 may expand as the pressure inside the hollow enclosure 950 increases and/or as the temperature inside the hollow enclosure 950 decreases.

The debubbler system 112 may also include a debubbler outlet 956 that allows the fluid to exit the debubbler system 112 (to flow to another component) along the cooling circuit 110. The debubbler outlet 956 may include piping of any suitable size for coupling to the cooling circuit 110. In certain embodiments, the debubbler outlet 956 may be of a similar size as the debubbler inlet 954. In this case, continuing the example above, the debubbler outlet 956 may include ⅜ inch cross-linked PEX tubing or piping of any suitable material and size. As illustrated, the debubbler outlet 956 may include an outlet bushing 958 to facilitate expelling fluid along the cooling circuit 110 via the debubbler outlet 956. In certain embodiments, the outlet bushing 958 may be of any suitable material such as polytetrafluoroethylene (PTFE) or any other suitable material having a low coefficient of friction. The outlet bushing 958 may be right machined.

It should be understood that the position of the debubbler inlet 954 and the debubbler outlet 956 may be switched. For example, in certain embodiments, the opening defining the debubbler inlet 954 may instead serve as the debubbler outlet 956 (e.g., to expel fluid out toward the cooling circuit 110), and the opening defining the debubbler outlet 956 may instead serve as the debubbler inlet 954 (e.g., to receive fluid via the cooling circuit 110). In certain embodiments, the distance between the debubbler inlet 954 and outlet 956 may be of any suitable length, such that the fluid surface area exposed to the air is large enough to allow air bubbles in the fluid to rise and join on the surface to escape to the air inside the hollow enclosure 950. In this manner, the bubbles (e.g., eventually rising to form part of the air inside the hollow enclosure 950) may be exhausted from the hollow enclosure via the check valve.

In certain embodiments, the debubbler system 112 may have an inner volume of any suitable size, for example, between about 9 in$^3$ to about 70 in$^3$. To facilitate discussion, the example discussed below will be in the context of a debubbler system 112 having an inner volume of about 35 in$^3$. In this example, the fluid level 953 (i.e., the line showing how high the fluid fills the hollow enclosure 950 of the debubbler system 112) may fluctuate as the fluid expands or compresses due to the fluctuation in temperatures from cooling the LED assembly 82. In this example, for a particular type of fluid, the air may occupy 9 in$^3$ and the fluid may occupy a volume of 26 in$^3$ when the fluid is at a lowest temperature. Furthermore, in this example, when the fluid is at a highest temperature, the air may occupy a volume of 15 in$^3$ and the fluid may occupy a volume of 20 in$^3$. Accordingly, the change in air pressure may be about 9 in$^3$/15 in$^3$, which may correspond to about a −5.9 pounds per square inch (PSI) change in pressure.

To reduce the increase in pressure resulting from this fluid expansion, the debubbler system 112 may include the check valve 114 that allows fluid to flow in one direction. In this case, the check valve 114 may allow gaseous fluid (e.g., air) out of the debubbler system 112, such that the check valve 114 prevents any fluids from entering the debubbler system 112. In this manner, the check valve 114 may allow air to be expelled from inside of the hollow enclosure 950 of the debubbler system 112 when the air inside the hollow enclosure 950 causes the pressure inside the hollow enclosure 950 to rise. As illustrated, the check valve 114 may include a corresponding bushing 960 to orient the check valve 114 and facilitate the exhaust of gaseous fluid out of the hollow enclosure 950. In certain embodiments, the corresponding bushing 960 may be of any suitable material such as PTFE or any other suitable material having a low coefficient of friction.

The check valve 114 may be concentric with the corresponding bushing 960. An O-ring 962 may facilitate coupling of the bushing 960 to a central axel 964. In certain embodiments, the central axel 964 may spin in rotational direction 971 about rotation axis 973. In certain embodiments, the central axel 964 may include a u-joint to facilitate rotation about an axis normal to a cross-sectional plane of FIG. 17. In this manner, the central axel may rotate about two axes. The check valve 114 may be fluidly coupled to a vent tube 966. In certain embodiments, the vent tube 966 may be oriented substantially perpendicular to the check valve 114, such that the junction between the check valve 114 and the vent tube 966 is substantially at a right angle or any degree between 45 degrees) (°) and 135°. In certain embodiments, an end 968 of the vent tube 966 is positioned opposite the end on which the fluid sits. In this manner, the vent tube 966 may be continuously exposed to the portion of the debubbler system 112 exposed to the air.

To facilitate this orientation, the debubbler system 112 may include a weighted member 970 positioned opposite the end 968 of the vent tube 966. In this manner, gravity may guide the orientation of the debubbler system 112, such that the preferred positional steady state of the debubbler system includes an orientation in which the weighted member 970 is positioned along the gravity vector. As illustrated, in certain embodiments, the weighted member 970 may surround or abut an internal tubing 972 configured to direct the fluid to the debubbler outlet 956 and out of the hollow enclosure 950 toward the cooling circuit 110. In some embodiments, the weighted member 970 may include a steel block machined from 1-inch bar stock and secured to the internal tubing 972 by any suitable fixture (e.g., spring pin). It should be understood that the weighted member 970 and the vent tube 966 may be fixed to the central axel 964 via any suitable attachment (e.g., pins, weldments, and so forth) opposite the end 968. Furthermore, the central axel 964 may rotate in rotation direction 971 about rotation axis 973, as discussed in more detail below. As such, rotation of the central axel 964 may also cause the vent tube 966 and the weighted member 970 to rotate in similar direction. In certain embodiments, the weighted member may be any percentage of the total weight of the debubbler system 112, such as 25%, 50%, 75%, 80% or any suitable percent there between.

FIGS. 18A-18C illustrate respective cross-sectional views of the debubbler system 112 for a particular orientation. As discussed above, during transportation of the debubbler system 112 and prior to installation, the debubbler system 112 may be manipulated to various orientations. Regardless of the orientation, in some embodiments, air bubbles may be prevented from entering the debubbler system 112, for example, during transportation. To illustrate one of these orientations, FIG. 18A is a cross-sectional view of the debubbler system 112 of FIG. 1 in a first orientation 974 having a weighted member 970 at the bottom of the debubbler system 112 of FIG. 1, in accordance with one or more current embodiments. In certain implementations, a portion or the entirety of the weighted member 970 remains below the water level. In the first orientation 974, the weighted member 970 may be positioned at the bottom of the debubbler system 112 relative to a gravity vector 975. As illustrated, when the debubbler system 112 is in the first orientation 974, the weighted member 970 may align the debubbler inlet 954 and the debubbler outlet 956 such that they are under the fluid level 953. In this manner, air is prevented from exiting the hollow enclosure 950 during transportation of the debubbler system 112 and/or air cannot enter the debubbler system 112 via the debubbler outlet 956. In certain embodiments, during transportation of the debubbler system 112, fluid does not flow through the debubbler inlet 954 and the debubbler outlet 956. During installation of the debubbler system 112 to the lighting assembly 70, air bubbles may enter the system (e.g., via the debubbler inlet or outlet 954, 956). The air bubbles may rise to the top of the fluid level and settle on the surface (e.g., due to buoyancy) before escaping the fluid and into the air to be removed by the check valve 114 (e.g., via the vent tube 966). The distance between the debubbler inlet 954 and outlet 956 may be of any suitable length, such that the fluid surface area exposed to the air is of a size to enable air bubbles in the fluid to rise and join on the surface to escape to the air inside the hollow enclosure 950.

FIG. 18B is a cross-sectional view of the debubbler system of FIG. 1 in a second orientation 976 having the debubbler inlet 954 oriented opposite a direction of the gravity vector 975, in accordance with one or more current embodiments. As illustrated, the debubbler system 112 may be transported or in operation in the second orientation 976. In the second orientation, the fluid level may cover an inlet port 977. The inlet port 977 may define a conduit out of which the fluid flows after being received at the debubbler inlet 954 from the cooling circuit 110 (FIG. 1). In the second orientation, the fluid level may cover the vent tube 966, such that the end 968 is under the fluid level 953. In the second orientation, the volume of the fluid in the debubbler system 112 may be at a fluid level 953 that prevents air from exiting the debubbler system 112 and/or entering the debubbler system 112 via the debubbler outlet 956. In certain embodiments, as the fluid compresses or expands (e.g., based on changes in temperature during transportation), air does not escape the debubbler system 112. The debubbler system 112 may not be in operation (e.g., receiving and exhausting coolant fluid driven by a pump, as discussed below) when it is oriented in the second orientation 976, for example, because air bubbles may still leave the fluid, but the air bubbles may not be able to exhaust out of the check valve 114. The debubbler system 112 may be oriented in the second orientation 976 during transportation of the debubbler system 112.

FIG. 18C is a cross-sectional view of the debubbler system of FIG. 1 in a third orientation 978, in which the debubbler outlet 956 is positioned opposite the gravity vector 975, in accordance with one or more current embodiments. Similar to in the second orientation 976, in the third orientation 978, the fluid level 953 may cover the vent tube 966, such that the end 968 is under the fluid level 953. In the third orientation 978, the volume of the fluid in the debubbler system 112 may be at a fluid level 953 that prevents air from exiting the debubbler system 112 and/or enter the debubbler system 112 via the debubbler outlet 956. In certain embodiments, as the fluid compresses or expands (e.g., based on changes in temperature during transportation), air does not escape the debubbler system 112 because the end 968 of the vent tube 966 is under the fluid level 953. The debubbler system 112 may not be in operation (e.g., receiving and exhausting coolant fluid driven by a pump, as discussed below) when it is oriented in the third orientation 978, for example, because air bubbles may still leave the fluid, but the air bubbles may not be able to exhaust out of the check valve 114. The debubbler system 112 may be oriented in the third orientation 978 during transportation of the debubbler system 112.

FIG. 19 is a flow diagram of a first arrangement 980 of the cooling system 80 of FIG. 1, including the debubbler system 112 of FIG. 17, in accordance with one or more current embodiments. As described above with respect to FIG. 3, the cooling system 80 may include an inlet pipe 140 fluidly coupled to the pump 108 and to a fluid inlet 142 of the LED assembly 82. The inlet pipe 140 may direct the flow of fluid into the center of the LED assembly 82. The cooling system 80 may also include an outlet pipe 144 fluidly coupling the outlet 146 to an inlet of the heat exchanger 106 (e.g., radiator 150). The cooling system 80 may include a radiator outlet pipe 982 fluidly coupling the outlet of the heat exchanger to the inlet of the pump 108. The inlet pipe 140, the outlet pipe 144, and the radiator outlet pipe 982 are illustrated as a solid dark line to reference that they may collectively define a first cooling flow path 984.

The debubbler system 112 may receive, via debubbler inlet pipe 986, a portion of the fluid directed out from the LED assembly 82. As discussed above, in certain configuration, the debubbler inlet 954 may serve as the outlet, while the debubbler outlet 956 may serve as the inlet. That is, the outlet pipe 144 may direct fluid to the heat exchanger 106 and the opening 956 (previously referred to as the debubbler outlet 956). For example, the flow path of fluid exiting the LED assembly 82 may split to direct fluid toward the debubbler system 112 and the heat exchanger 106. In certain embodiments, the fluid received by the debubbler system 112 may bypass the heat exchanger 106 and may expand inside the debubbler system 112 while the check valve 114 removes air bubbles. In certain embodiments, the check valve 114 may release pressure in response to the pressure within the enclosure exceeding a certain pressure threshold value. For example, for a pump 108 rated to output fluid at 3 PSI, the pressure threshold value may be 0.5 PSI, such that the check valve 114 may vent air out from the hollow enclosure 950 in response to the internal pressure exceeding the pressure threshold (e.g., 0.5 PSI). By venting air out from the hollow enclosure 950 as the pressure rises, the bubbles in the fluid may be reduced, thereby improving the cooling properties of the fluid and the overall cooling of the LED assembly 82.

Fluid received via the opening 956 (previously referred to as the debubbler outlet 956) may exit the debubbler system 112 via the opening 954 (previously referred to as the debubbler inlet 954) by way of a debubbler outlet pipe 988 to join with the radiator outlet pipe 982. In this case, the pump 108 may receive fluid from the heat exchanger 106 (e.g., via the radiator outlet pipe 982) and from the debubbler system 112 (e.g., via the opening 954) to direct the fluid back to the LED assembly 82. The debubbler system 112 may receive fluid via a second fluid flow path 990 defined by the outlet pipe 144, the debubbler inlet pipe 986, debubbler outlet pipe 988, and an inlet to the pump 108 (as well as all intermediate components, such as the LED assembly 82, the debubbler system 112, and the pump 108). To facilitate illustration, the second fluid flow path 990 is illustrated with a dashed line. In certain embodiments, the second fluid flow path 990 does not include the heat exchanger 106, such that the debubbler system 112 receives fluid from the LED assembly 82 (and not the heat exchanger 106) to remove air bubbles prior to directing fluid back to the pump 108.

FIG. 20 is a flow diagram of a second arrangement 992 of the cooling system 80 of FIG. 1, including the debubbler system 112 of FIG. 1, in accordance with one or more current embodiments. As described above with respect to FIG. 3, the cooling system 80 may include an inlet pipe 140 fluidly coupling the pump 108 to a fluid inlet 142 of the LED assembly 82. The inlet pipe 140 may direct the flow of fluid into the LED assembly 82, as described above with respect to FIG. 8. The cooling system 80 may also include an outlet pipe 144 fluidly coupling the outlet 146 to an inlet of the heat exchanger 106 (e.g., radiator 150), as described above with respect to FIG. 8. The cooling system 80 may include a radiator outlet pipe 982 fluidly coupling the outlet of the heat exchanger to the inlet of the pump 108. The inlet pipe 140, the outlet pipe 144, and the radiator outlet pipe 982 are illustrated as a solid dark line to reference that they may collective define a first cooling flow path 984.

As illustrated, the second arrangement 992 includes the debubbler system 112. In certain embodiments, the debubbler system 112 may receive fluid from two flow paths. First, the debubbler system 112 may receive fluid directly from the LED assembly 82, for example, via the fluid outlet 204 (e.g., as shown in FIG. 8) by way of the first debubbler inlet pipe 986A. Second, the debubbler system 112 may receive fluid from the heat exchanger 106 by way of a second debubbler inlet pipe 986B. For example, the fluid exiting the heat exchanger 106 via the radiator outlet pipe 982 may be directed to the pump 108 and the debubbler system 112. It should be understood that in certain embodiments, the debubbler system 112 may receive fluid from one flow path, such that either the first debubbler inlet pipe 986A or the second debubbler inlet pipe 986B may be omitted.

The debubbler system 112 may receive fluid via a second fluid flow path 990 defined by the first debubbler inlet pipe 986A, the debubbler outlet pipe 988, and an inlet to the pump 108 (as well as all intermediate components, such as the LED assembly 82, the debubbler system 112, and the pump 108). In certain embodiments, the second fluid flow path 990 does not include the heat exchanger 106.

The debubbler system 112 may receive fluid via a third fluid flow path 994 defined by the outlet pipe 144, the radiator outlet pipe 982, the second debubbler inlet pipe 986B, the debubbler outlet pipe 988, and an inlet to the pump 108 (as well as all intermediate components, such as the LED assembly 82, the debubbler system 112, and the pump 108, and the heat exchanger 106). In the second arrangement 992, the debubbler system 112 receives fluid from the LED assembly 82 and the heat exchanger 106 to remove air bubbles that may have developed in the LED assembly 82 and the heat exchanger 106. Fluid received via the opening 956 (previously referred to as the debubbler outlet 956) may exit the debubbler system 112 via the opening 954 (previously referred to as the debubbler inlet 954) by way of a debubbler outlet pipe 988 to join with the radiator outlet pipe 982. In this case, the pump 108 may receive fluid from the heat exchanger 106 (e.g., via the radiator outlet pipe 982) and from the debubbler system 112 (e.g., via the opening 954) to direct the fluid back to the LED assembly 82. In an embodiment, the second fluid flow path 990 and the third fluid flow path 994 may be alternative flow paths.

In certain embodiments, the fluid received by the debubbler system 112 (e.g., from the LED assembly 82 and/or the heat exchanger 106) may expand inside the debubbler system 112 and the check valve 114 may remove air bubbles. In certain embodiments, the check valve 114 may release pressure in response to the pressure within the enclosure exceeding or reaching a certain pressure threshold value. For example, for a pump 108 rated to output fluid at 3 PSI, the pressure threshold value may be 0.5 PSI, such that the check valve 114 may vent air out from the hollow enclosure 950 in response to the internal pressure exceeding the pressure threshold (e.g., 0.5 PSI). In this manner, by venting air out from the hollow enclosure 950 as the pressure rises, the bubbles in the fluid may be reduced, thereby improving the cooling properties of the fluid and the overall cooling of the LED assembly 82.

FIG. 21 is a flow diagram of a third arrangement 996 of the cooling system 80 of FIG. 1, including the debubbler system 112 of FIG. 1, in accordance with one or more current embodiments. While the first and second arrangements 980, 992 of FIGS. 19 and 20, respectively, include the debubbler system 112 as separate from the pump 108, in certain embodiments, the pump 108 may be integral to the debubbler system 112, such that the debubbler system 112 may be positioned in series with respect to the first cooling flow path 984, as illustrated. In certain embodiments, the debubbler system may be fluidly coupled to the pump 108 and/or the heat exchanger 106, for example, in a parallel arrangement. It should be understood that in certain embodiments, such as the third arrangement 996, the debubbler system 112 may be fluidly coupled to the pump 108 and the heat exchanger 106, for example, in series.

As described above with respect to FIG. 3, the cooling system 80 may include an inlet pipe 140 fluidly coupling to the pump 108 and to a fluid inlet 142 of the LED assembly 82. The inlet pipe 140 may direct the flow of fluid into the center of the LED assembly 82. The cooling system 80 may also include an outlet pipe 144 fluidly coupling the outlet 146 to an inlet of the heat exchanger 106 (e.g., radiator 150). The cooling system 80 may include a radiator outlet pipe 982 fluidly coupling the outlet of the heat exchanger 106 to the opening 956 (previously referred to as the debubbler outlet 956) of the debubbler system 112.

The debubbler system 112 may receive, via the radiator outlet pipe 982, the fluid from the heat exchanger 106. For example, the fluid exiting the LED assembly 82 may be directed to the heat exchanger 106 to be cooled. Then the fluid may be directed to the debubbler system 112 and the heat exchanger 106 to remove air bubbles in the fluid. In certain embodiments, the check valve 114 of the debubbler system 112 may release pressure in response to the pressure within the enclosure exceeding a certain pressure threshold value. For example, for a pump 108 rated to output fluid at 3 PSI, the pressure threshold value may be 0.5 PSI, such that the check valve 114 may vent air out from the hollow enclosure 950 in response to the internal pressure exceeding the pressure threshold (e.g., 0.5 PSI). In this manner, by venting air out from the hollow enclosure 950 as the pressure rises, the bubbles in the fluid may be reduced, thereby improving the cooling properties of the fluid and the overall cooling of the LED assembly 82. Although FIG. 21 illustrates the debubbler system 112 and the pump 108 as separate components in series, the debubbler system 112 and the pump 108 may also be combined into a single component.

FIG. 22 is a rear perspective view of an embodiment of the lighting assembly 187 of FIG. 6A including the cooling system 80 of FIG. 1, having the debubbler system 112 of FIG. 1, in accordance with one or more current embodiments. To facilitate illustration, the LED assembly 82 has been omitted from the schematic diagram of FIG. 22, but the inlet pipe 140, the outlet pipe 144, and the valve 156 have been reproduced. As illustrated, the heat exchanger 106 and the pump 108 are mounted to the chassis 86 of the lighting assembly 70. The heat exchanger 106 may include the radiator 150 and any number of fans 152, as discussed above.

As illustrated, the lighting assembly 187 includes a first bracket 191 coupled to the radiator 150 and debubbler system 112, and a second bracket 195 coupled to the radiator 150 and the pump 108. The first and second brackets 191, 195 may include vibration pads. The radiator 150 and the debubbler system may be mounted to the first bracket 191, and the first bracket 191 is mounted to the chassis 86, such that the first bracket 191 is configured to support a weight of the debubbler system 112 and/or at least a portion of a weight of the radiator 150 (e.g., to transfer forces associated with the weight(s) to the chassis 86). Additionally, the radiator 150 and the pump 108 may be mounted to the second bracket 195, and the second bracket 195 is mounted to the chassis 86, such that the second bracket 195 is configured to support a weight of the pump 108 and/or at least a portion of the weight of the radiator 150 (e.g., to transfer forces associated with the weight(s) to the chassis 86). In certain embodiments, the heat exchanger 106, the pump 108, and the debubbler system 112 may be housed inside the lighting assembly 187.

FIG. 23 is a perspective view of an inside of the hollow enclosure 950, in accordance with one or more current embodiments. As mentioned above, the hollow enclosure 950 may include two molded enclosures 952 forming a sealed cavity. In some embodiments, the hollow enclosure 950 may expand. As illustrated, the vent tube 966 may be positioned on an opposite end from the weighted member 970. For example, the vent tube 966 and the weighted member 970 may be fixed to the central axel 964, such that the central axel 964 is configured to rotate in rotation direction 971 about the rotation axis 973. The rotation axis 973 may intersect the center of the circular cross-section of the central axel 964. The rotation axis 973 may be perpendicular to a line formed between the end 968 of the vent tube 966 and the weighted member 970. By rotating relative to the rotation axis 973, the vent tube 966 may remain above the fluid level because as the fluid level settles in accordance with the gravity vector 975, the weight member 970 may also rotate to settle with the gravity. In addition or alternatively, a u-joint associated with the central axel 964 may facilitate rotation along another axis (e.g., perpendicular to the rotation axis 973).

FIGS. 24, 25, and 26 are respective cross-section views of the debubbler system 112 of FIG. 2, including a fluid level sensor 115, in accordance with one or more current embodiments. The fluid level sensor 115 may include photodiode 998 configured to detect light produced by a light source 999. The photodiode 998 may include any suitable semiconductor device configured to convert light into an electrical current (e.g., a signal) communicated to the controller 120 (FIG. 1). The electrical current may be generated in response to photons absorbed by the photodiode 998. In certain embodiments, the photodiode 998 may include optical filters, built-in lenses, and a surface area for receiving photons.

The light source 999 may include any suitable light source, such as a laser beam (e.g., red laser beam). For example, the light source 999 may include any suitable device that emits light through optical amplification based on the stimulated emission of electromagnetic radiation. The debubbler system 112 may include a mirror 1000 positioned on the central axel 964. In certain embodiments, the mirror 1000 may be fixed to the central axel 964, such that the mirror 1000 rotates with the central axel. The mirror 100 may be disk-shaped with a central opening such that the internal tubing 972 extends through the central opening.

As discussed above, the fluid level sensor 115 (e.g., the photodiode 998 and the light source 999) may be communicatively coupled to the controller 120. The controller 120 may output a signal to the light source 999 to cause the light source 999 to emit a light that may be detected by the photodiode 998. In certain embodiments, the controller 120 may be configured to output a signal (e.g., an output signal) to the pump 108 indicative of instructions to adjust the flowrate of the fluid flowing through the cooling circuit 110 based on a fluid level inside the debubbler system 112. For example, if the fluid level is below a fluid level threshold value as determined by the fluid level sensor 115 (and communicated to the controller 120), the controller 120 may output a signal (e.g., an output signal) to the pump 108 indicative of instructions to increase the flowrate of the fluid flowing through the cooling circuit 110 to increase the volume within the debubbler system 112.

As illustrated in FIG. 24, the fluid level 953 (FIG. 17) may be above a threshold fluid level (e.g., sufficient for fluid to flow through the debubbler inlet 954 and the debubbler outlet 956). When the fluid level 953 is above the threshold fluid level, the light emitted from the light source 999 may pass through the fluid. Because the index of refraction associated with the fluid may be higher than the index of refraction associated with air, the emitted light may diffract (e.g., bend), reflect off the mirror 1000, and be detected by the photodiode 998. In this case, the controller 120 may receive the indication of the detection of light from the light source 999 by the photodiode 998 to cause the pump 108 to maintain the flow rate of fluid.

As illustrated in FIG. 25, the fluid level 953 (FIG. 17) may be below the threshold fluid level. When the fluid level 953 is below a threshold fluid level (e.g., insufficient for fluid to flow through the debubbler inlet 954 and the debubbler outlet 956), the light emitted from the light source 999 may pass through air. In this case, the emitted light may not be diffracted, so it may go undetected by the photodiode 998 (e.g., because the emitted light does not reflect off the mirror 1000 toward the photodiode 998). In this case, the controller 120 may receive the indication of the lack of detection of light from the light source 999 by the photodiode 998 to cause the pump 108 to increase the flow rate of fluid.

As illustrated in FIG. 26, the photodiode 998 and light source 999 may be positioned in close proximity to one another. For example, the photodiode 998 may be positioned slightly below the threshold fluid level and the light source 999 may be positioned above the rotation axis 973 and below the photodiode 998. In certain embodiments, the fluid level sensor 115 (e.g., the photodiode 998 and light source 999) may be positioned external to the hollow enclosure 950. In this manner, servicing and replacing the fluid level sensor 115 or any suitable component of the fluid level sensor 115 may be more easily replaced.

FIGS. 27A-C illustrate the lighting assembly 70 and the corresponding debubbler system 112 in various orientations, in accordance with one or more current embodiments. In particular, FIG. 27A is a schematic diagram of the lighting assembly 70 of FIG. 1 oriented in an upward position, FIG. 27B is a schematic diagram of the lighting assembly of FIG. 1 oriented in a horizontal position, and FIG. 27C is a schematic diagram of the lighting assembly of FIG. 1 oriented in a downward position, in accordance with one or more current embodiments. To facilitate illustration, FIGS. 27A-C include the coordinate system of FIG. 1 fixed to the lighting assembly and defining a longitudinal axis 90, a lateral axis 92, and a vertical axis 94. As the lighting assembly 70 is oriented (e.g., to provide light to a particular target) the debubbler system 112 may also be oriented, such that the weighted member 970 (and the central axel 964) rotates to conform to the gravity vector 975.

Technical effects of the present disclosure include debubbler systems and methods to reduce bubbles in coolant flow paths associated with light cooling systems of an electronic systems to improve cooling of electronic systems. The debubbler system may include a hollow enclosure that includes an inlet and an outlet to receive coolant fluid via the coolant fluid flow path. Technical effects of the present disclosure include not allowing air to enter the hollow enclosure during transportation of the debubbler system to ensure proper fluid properties resultant from reduced air bubbles. The debubbler system may include a check valve to exhaust air bubbles in the coolant fluid out of the hollow enclosure to reduce air bubbles in the coolant fluid. The check valve may be fluidly coupled to the vent tube, such that an opening of the vent tube is above the fluid.

This written description uses examples of the presently disclosed embodiments, including the best mode, and also to enable any person skilled in the art to practice the disclosed embodiments, including making and using any devices or systems and performing any incorporated methods. The patentable scope of the disclosed embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. That is, while only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function]. . . " or "step for [perform]ing [a function]. . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A debubbler system, comprising:
a hollow enclosure comprising an inlet and an outlet configured to direct flow of coolant fluid into and out from the hollow enclosure, respectively;
a check valve configured to exhaust gaseous bubbles in the coolant fluid out of the hollow enclosure to reduce the gaseous bubbles in the coolant fluid; and
a vent tube fluidly coupled to the check valve, wherein the vent tube is positioned opposite a weighted member, wherein the weighted member and the vent tube are fixed to a central axel configured to rotate inside the hollow enclosure.

2. The debubbler system of claim 1, wherein the weighted member is configured to couple to an internal tubing configured to direct the coolant fluid toward the outlet or the inlet.

3. The debubbler system of claim 1, comprising a fluid level sensor comprising a photodiode configured to detect a reflected light from a light source and to generate a signal in response to detecting the reflect light.

4. The debubbler system of claim 3, wherein the signal is received by a controller, and wherein the controller is configured to send a control signal to a pump to increase, decrease, or maintain a flow rate of the coolant fluid.

5. The debubbler system of claim 1, wherein a volume of coolant fluid inside the hollow enclosure is maintained during transportation of the debubbler system to prevent gas external to the hollow enclosure from entering the hollow enclosure.

6. The debubbler system of claim 1, wherein the check valve is configured to exhaust the gaseous bubbles in response to an internal pressure inside the hollow enclosure exceeding a threshold pressure value, and wherein the threshold pressure value is less than three pounds per square inch (PSI).

7. The debubbler system of claim 1, wherein the inlet is configured to receive the coolant fluid from an electronics system.

8. The debubbler system of claim 1, wherein the inlet is configured to receive the coolant fluid from a light emitting diode ("LED") device.

9. The debubbler system of claim 1, comprising a pump fluidly coupled to the outlet of the debubbler system, wherein the pump is configured to drive the flow of the coolant fluid.

10. The debubbler system of claim 1, wherein the inlet is positioned on a first side of the hollow enclosure and the outlet is positioned on a second side of the hollow enclosure, wherein the first side is positioned opposite the second side.

11. A cooling system for a light emitting diode ("LED") assembly, comprising:
    a fluid configured to absorb heat that is generated by the LED assembly;
    a heat exchanger configured to remove heat absorbed by the fluid in the LED assembly;
    an enclosure configured to house the LED assembly;
    a debubbler system configured to receive the fluid and configured to remove air bubbles from the fluid; and
    a pump configured to circulate the fluid through the enclosure, through the LED assembly, or both, and through the heat exchanger, wherein the debubbler system and the pump are a single component or separate components.

12. The cooling system of claim 11, wherein the debubbler system comprises:
    a hollow enclosure comprising an inlet and an outlet configured to direct flow of coolant fluid into and out from the hollow enclosure, respectively;
    a check valve configured to exhaust gaseous bubbles in the coolant fluid out of the hollow enclosure to reduce the gaseous bubbles in the coolant fluid; and
    a vent tube fluidly coupled to the check valve, wherein the vent tube is positioned opposite a weighted member, wherein the weighted member is fixed relative to the hollow enclosure.

13. The cooling system of claim 11, wherein the debubbler system is configured to receive the fluid directly from the LED assembly directly via a first fluid flow path, wherein the first fluid flow path fluidly couples a first outlet of the LED assembly to an inlet of the debubbler.

14. The cooling system of claim 13, wherein the debubbler system is configured to receive the fluid from an outlet of the heat exchanger via a second fluid flow path, wherein the second fluid flow path couples the outlet of the heat exchanger to the inlet of the debubbler.

15. The cooling system of claim 11, comprising:
    a fluid level sensor comprising a photodiode configured to detect a reflected light from a light source and configured to generate a signal in response to detecting the reflect light; and
    a controller communicatively coupled to the pump and the fluid level sensor, wherein the controller is configured to control a flow rate through the pump based on the signal.

16. The cooling system of claim 11, wherein the debubbler system is configured to receive the fluid only from the heat exchanger and configured to output the fluid only to the pump.

17. The cooling system of claim 11, wherein the debubbler system and the pump are mechanically coupled to a radiator of the heat exchanger by way of a respective bracket member.

18. A electronics cooling system to reduce air bubbles in an electronics module, the electronics cooling system comprising:
    a pump configured to drive flow of coolant fluid along a cooling circuit; and
    a debubbler system fluidly coupled to the pump via the cooling circuit, wherein the debubbler system comprises:
    a check valve configured to exhaust gaseous bubbles in the coolant fluid out of a hollow enclosure to reduce the gaseous bubbles in the coolant fluid; and
    a vent tube positioned inside the hollow enclosure and fluidly coupled to the check valve at a first end, wherein the vent tube is positioned opposite a weighted member, and wherein the vent tube is exposed to air via a second end.

19. The electronics cooling system of claim 18, comprising:
    an electronic system comprising:
    an electrical component; and
    one or more conduits to receive the coolant fluid to remove heat from the electric component.

20. The electronics cooling system of claim 18, wherein a volume of coolant fluid inside the hollow enclosure is maintained above the first end of the vent tube and below the second end of the vent tube.

* * * * *